United States Patent [19]
Kaneko et al.

[11] Patent Number: 5,822,323
[45] Date of Patent: Oct. 13, 1998

[54] FREQUENCY DIVISION MULTIPLEXED SIGNAL GENERATING APPARATUS AND RELATED DECODING APPARATUS

[75] Inventors: Keiichi Kaneko, Yokohama; Katsumi Ohno, Yokosuka, both of Japan

[73] Assignee: Victor Company of Japan, Ltd., Yokohama, Japan

[21] Appl. No.: 716,967

[22] Filed: Sep. 20, 1996

[30] Foreign Application Priority Data

Sep. 29, 1995 [JP] Japan .................................. 7-252216
Oct. 24, 1995 [JP] Japan .................................. 7-275256

[51] Int. Cl.$^6$ ...................................................... H04J 1/00
[52] U.S. Cl. ........................................ 370/480; 370/210
[58] Field of Search ................................ 370/480, 295, 370/330, 344, 343, 203, 206, 207, 208, 209, 210, 211, 302; 375/261, 272, 298, 303, 334

[56] References Cited

U.S. PATENT DOCUMENTS 4,107,470 8/1978 Maruta .................................. 375/270
5,425,050 6/1995 Schreiber et al. ...................... 375/200

Primary Examiner—Dang Ton
Attorney, Agent, or Firm—Pollock, Vande Sande & Priddy

[57] ABSTRACT

An IDFT section has a set of input terminals subjected to components of an information signal respectively. The IDFT section subjects the information signal to inverse discrete Fourier transform to convert the information signal into a pair of a first in-phase signal and a first quadrature signal while assignment of the components of the information signal to the input terminals is in a first state. A first power-related value of one of the first in-phase signal and the first quadrature signal is calculated. The first in-phase signal and the first quadrature signal are written into an output buffer memory when the calculated first power-related value does not exceed a predetermined reference value. The assignment of the components of the information signal to the input terminals is changed from the first state to a second state when the calculated first power-related value exceeds the predetermined reference value. The IDFT section subjects the information signal to inverse discrete Fourier transform to convert the information signal into a pair of a second in-phase signal and a second quadrature signal while the assignment of the components of the information signal to the input terminals is in the second state. A second power-related value of one of the second in-phase signal and the second quadrature signal is calculated. The second in-phase signal and the second quadrature signal are written into the output buffer memory when the calculated second power-related value does not exceed the predetermined reference value.

26 Claims, 18 Drawing Sheets

FIG. 5

| CARRIER ORDER NUMBER | REAL-PART INPUT | IMAGINARY-PART INPUT |
|---|---|---|
| 0 | FIXED | FIXED |
| 256 | FIXED | FIXED |
| 128 | FIXED | FIXED |
| 384 | FIXED | FIXED |
| 64 | A | B |
| 320 | 0 | 0 |
| 192 | 0 | 0 |
| 448 | C | D |
| 32 | E | F |
| 228 | 0 | 0 |
| 160 | 0 | 0 |
| 416 | G | H |
| ⋮ | ⋮ | ⋮ |

FIG. 6

| CARRIER ORDER NUMBER | REAL-PART INPUT | IMAGINARY-PART INPUT |
|---|---|---|
| 0 | FIXED | FIXED |
| 256 | FIXED | FIXED |
| 128 | FIXED | FIXED |
| 384 | FIXED | FIXED |
| 64 | C | D |
| 320 | 0 | 0 |
| 192 | 0 | 0 |
| 448 | E | F |
| 32 | G | H |
| 228 | 0 | 0 |
| 160 | 0 | 0 |
| 416 | I | J |
| ⋮ | ⋮ | ⋮ |
| FINAL | A | B |

FIG. 7

| CARRIER ORDER NUMBER | REAL-PART INPUT | IMAGINARY-PART INPUT |
|---|---|---|
| 0 | FIXED | FIXED |
| 256 | FIXED | FIXED |
| 128 | FIXED | FIXED |
| 384 | FIXED | FIXED |
| 64 | A | B |
| 320 | 0 | 0 |
| 192 | 0 | 0 |
| 448 | C | D |
| 32 | E | F |
| 228 | 0 | 0 |
| 160 | 0 | 0 |
| 416 | G | H |
| • • • | • • • | • • • |
| FINAL | Y | Z |

FIG. 8

| CARRIER ORDER NUMBER | REAL-PART INPUT | IMAGINARY-PART INPUT |
|---|---|---|
| 0 | FIXED | FIXED |
| 256 | FIXED | FIXED |
| 128 | FIXED | FIXED |
| 384 | FIXED | FIXED |
| 64 | A | D |
| 320 | 0 | 0 |
| 192 | 0 | 0 |
| 448 | C | F |
| 32 | E | H |
| 228 | 0 | 0 |
| 160 | 0 | 0 |
| 416 | G | J |
| ⋮ | ⋮ | ⋮ |
| FINAL | Y | B |

FIG. 9

| CARRIER ORDER NUMBER | REAL-PART INPUT | IMAGINARY-PART INPUT |
|---|---|---|
| 0 | FIXED | FIXED |
| 256 | FIXED | FIXED |
| 128 | FIXED | FIXED |
| 384 | FIXED | FIXED |
| 64 | A | F |
| 320 | 0 | 0 |
| 192 | 0 | 0 |
| 448 | C | H |
| 32 | E | J |
| 228 | 0 | 0 |
| 160 | 0 | 0 |
| 416 | G | L |
| ⋮ | ⋮ | ⋮ |
| FINAL | Y | D |

FIG. 13

| BEFORE SHIFT | AFTER SHIFT | | ADJUSTED FORM |
|---|---|---|---|
| $E_0 + W^0 H_0$ | $E_0 + W^1 H_1$ | = | $E_0 + W^0 W^1 H_1$ |
| $E_1 + W^1 H_1$ | $E_1 + W^2 H_2$ | = | $E_1 + W^1 W^1 H_2$ |
| $E_2 + W^2 H_2$ | $E_2 + W^3 H_3$ | = | $E_2 + W^2 W^1 H_3$ |
| $E_3 + W^3 H_3$ | $E_3 + W^4 H_4$ | = | $E_3 + W^3 W^1 H_4$ |
| $E_4 + W^4 H_4$ | $E_4 + W^5 H_5$ | = | $E_4 + W^4 W^1 H_5$ |
| $E_5 + W^5 H_5$ | $E_5 + W^6 H_6$ | = | $E_5 + W^5 W^1 H_6$ |
| $E_6 + W^6 H_6$ | $E_6 + W^7 H_7$ | = | $E_6 + W^6 W^1 H_7$ |
| $E_7 + W^7 H_7$ | $E_7 - W^0 H_0$ | = | $E_7 + W^7 W^1 H_0$ |
| $E_0 - W^0 H_0$ | $E_0 - W^1 H_1$ | = | $E_0 - W^0 W^1 H_1$ |
| $E_1 - W^1 H_1$ | $E_1 - W^2 H_2$ | = | $E_1 - W^1 W^1 H_2$ |
| $E_2 - W^2 H_2$ | $E_2 - W^3 H_3$ | = | $E_2 - W^2 W^1 H_3$ |
| $E_3 - W^3 H_3$ | $E_3 - W^4 H_4$ | = | $E_3 - W^3 W^1 H_4$ |
| $E_4 - W^4 H_4$ | $E_4 - W^5 H_5$ | = | $E_4 - W^4 W^1 H_5$ |
| $E_5 - W^5 H_5$ | $E_5 - W^6 H_6$ | = | $E_5 - W^5 W^1 H_6$ |
| $E_6 - W^6 H_6$ | $E_6 - W^7 H_7$ | = | $E_6 - W^6 W^1 H_7$ |
| $E_7 - W^7 H_7$ | $E_7 + W^0 H_0$ | = | $E_7 - W^7 W^1 H_0$ |

| SECOND-STAGE RESULTS | THIRD-STAGE RESULTS | | | | FOURTH-STAGE RESULTS | | | |
|---|---|---|---|---|---|---|---|---|
| | | | | | $F1(t)$ | $F2(t)$ | $F3(t)$ | $F4(t)$ |
| $A_0$ | $A_0$ | $W^0 B_0$ | 0 | 0 | $A_0$ | $W^0 B_0$ | $W^0 C_0$ | $W^0 W^0 D_0$ |
| $A_1$ | $A_1$ | $W^2 B_1$ | 0 | 0 | $A_1$ | $W^2 B_1$ | $W^1 C_1$ | $W^1 W^2 D_1$ |
| $A_2$ | $A_2$ | $W^4 B_2$ | 0 | 0 | $A_2$ | $W^4 B_2$ | $W^2 C_2$ | $W^2 W^4 D_2$ |
| $A_3$ | $A_3$ | $W^6 B_3$ | 0 | 0 | $A_3$ | $W^6 B_3$ | $W^3 C_3$ | $W^3 W^6 D_3$ |
| $B_0$ | $A_0$ | $-W^0 B_0$ | 0 | 0 | $A_0$ | $-W^0 B_0$ | $W^4 C_0$ | $-W^4 W^0 D_0$ |
| $B_1$ | $A_1$ | $-W^2 B_1$ | 0 | 0 | $A_1$ | $-W^2 B_1$ | $W^5 C_1$ | $-W^5 W^2 D_1$ |
| $B_2$ | $A_2$ | $-W^4 B_2$ | 0 | 0 | $A_2$ | $-W^4 B_2$ | $W^6 C_2$ | $-W^6 W^4 D_2$ |
| $B_3$ | $A_3$ | $-W^6 B_3$ | 0 | 0 | $A_3$ | $-W^6 B_3$ | $W^7 C_3$ | $-W^7 W^6 D_3$ |
| $C_0$ | 0 | 0 | $C_0$ | $W^0 D_2$ | $A_0$ | $W^0 B_0$ | $-W^0 C_0$ | $-W^0 W^0 D_0$ |
| $C_1$ | 0 | 0 | $C_1$ | $W^2 D_1$ | $A_1$ | $W^2 B_1$ | $-W^1 C_1$ | $-W^1 W^2 D_1$ |
| $C_2$ | 0 | 0 | $C_2$ | $W^4 D_2$ | $A_2$ | $W^4 B_2$ | $-W^2 C_2$ | $-W^2 W^4 D_2$ |
| $C_3$ | 0 | 0 | $C_3$ | $W^6 D_3$ | $A_3$ | $W^6 B_3$ | $-W^3 C_3$ | $-W^3 W^6 D_3$ |
| $D_0$ | 0 | 0 | $C_0$ | $-W^0 D_2$ | $A_0$ | $-W^0 B_0$ | $-W^4 C_0$ | $W^4 W^0 D_0$ |
| $D_1$ | 0 | 0 | $C_1$ | $-W^2 D_1$ | $A_1$ | $-W^2 B_1$ | $-W^5 C_1$ | $W^5 W^2 D_1$ |
| $D_2$ | 0 | 0 | $C_2$ | $-W^4 D_2$ | $A_2$ | $-W^4 B_2$ | $-W^6 C_2$ | $W^6 W^4 D_2$ |
| $D_3$ | 0 | 0 | $C_3$ | $-W^6 D_3$ | $A_3$ | $-W^6 B_3$ | $-W^7 C_3$ | $W^7 W^6 D_3$ |

FIG. 20

| RECEIVED DATA (BEFORE CORRECTION) | | TRANSMITTED DATA (AFTER SHIFT) | | | |
|---|---|---|---|---|---|
| | | $F1'(t)$ | $F2'(t)$ | $F3'(t)$ | $F4'(t)$ |
| $b_0' =$ | $b_0$ | $A_0$ | $W^4 B_2$ | $W^3 C_3$ | $W^7 W^6 D_3$ |
| $b_8' =$ | $b_8$ | $A_1$ | $W^8 B_3$ | $W^4 C_0$ | $W^0 W^0 D_0$ |
| $b_4' =$ | $b_4$ | $A_2$ | $-W^0 B_0$ | $W^5 C_1$ | $W^1 W^2 D_1$ |
| $b_{12}' =$ | $b_{12}$ | $A_3$ | $-W^2 B_1$ | $W^5 C_2$ | $W^2 W^4 D_2$ |
| $b_2' = W^4 b_2$ | | $A_0$ | $-W^4 B_2$ | $W^7 C_3$ | $W^3 W^6 D_3$ |
| $b_{10}' = W^{20} b_{10}$ | | $A_1$ | $-W^8 B_3$ | $-W^0 C_0$ | $-W^4 W^0 D_0$ |
| $b_6' = W^{12} b_6$ | | $A_2$ | $W^0 B_0$ | $-W^1 C_1$ | $-W^5 W^2 D_1$ |
| $b_{14}' = W^{28} b_{14}$ | | $A_3$ | $W^2 B_1$ | $-W^2 C_2$ | $-W^6 W^4 D_2$ |
| $b_1' = W^3 b_1$ | | $A_0$ | $W^4 B_2$ | $-W^3 C_3$ | $-W^7 W^6 D_3$ |
| $b_9' = W^{27} b_9$ | | $A_1$ | $W^8 B_3$ | $-W^4 C_0$ | $-W^0 W^0 D_0$ |
| $b_5' = W^{15} b_5$ | | $A_2$ | $-W^0 B_0$ | $-W^5 C_1$ | $-W^1 W^2 D_1$ |
| $b_{13}' = W^{39} b_{13}$ | | $A_3$ | $-W^2 B_1$ | $-W^5 C_2$ | $-W^2 W^4 D_2$ |
| $b_3' = W^{-3} b_3$ | | $A_0$ | $-W^4 B_2$ | $-W^7 C_3$ | $-W^3 W^6 D_3$ |
| $b_{11}' = W^{-11} b_{11}$ | | $A_1$ | $-W^8 B_3$ | $W^0 C_0$ | $W^4 W^0 D_0$ |
| $b_7' = W^{-7} b_7$ | | $A_2$ | $W^0 B_0$ | $W^1 C_1$ | $W^5 W^2 D_1$ |
| $b_{15}' = W^{-15} b_{15}$ | | $A_3$ | $W^2 B_1$ | $W^2 C_2$ | $W^6 W^4 D_2$ |

FREQUENCY DIVISION MULTIPLEXED SIGNAL GENERATING APPARATUS AND RELATED DECODING APPARATUS

BACKGROUND OF THE INVENTION

1. Field of the Invention

This invention relates to an apparatus for generating a frequency division multiplexed signal such as an orthogonal frequency division multiplexed signal. This invention also relates to a decoding apparatus for a frequency division multiplexed signal. Furthermore, this invention relates to a method of generating a frequency division multiplexed signal. This invention also relates to a decoding method for a frequency division multiplexed signal.

2. Description of the Prior Art

Some of systems for transmitting digital information signals such as digital video signals in limited frequency bands employ orthogonal frequency division multiplexing (OFDM). Examples of digital information signals handled by such OFDM-based transmitting systems are multi-value modulation signals or 256-QAM (quadrature amplitude modulation) signals. In general, OFDM-based transmission is good in suppressing multipath effects and jamming signal effects. Further, the OFDM-based transmission has a good efficiency of frequency use.

Orthogonal frequency division multiplexing (OFDM) employs multiple carriers which are orthogonal with respect to each other. The multiple carriers are modulated in accordance with independent digital information pieces to be transmitted, respectively. A resultant OFDM signal has a form as a random signal. The "orthogonal" multiple carriers mean that the spectrums of carriers neighboring one carrier are null at the frequency of the latter carrier.

Data transmission based on OFDM is executed symbol by symbol. Each OFDM transmission symbol interval is composed of a guard interval and an effective symbol interval. The guard interval precedes the effective symbol interval. The guard interval is used for reducing multipath effects. The effective symbol interval is used for transmitting information (data). A part of information transmitted during the effective symbol interval is also transmitted during the guard interval.

A receiver side detects amplitude and phase modulation components of a signal transmitted for every symbol interval, and recovers an information value from the detected amplitude and phase modulation components. For every symbol, a receiver side discards a signal transmitted during a guard interval and uses only a signal transmitted during an effective symbol interval. The signal transmitted during the effective symbol interval is decoded into original data (original information).

In data transmission based on OFDM, a relatively narrow frequency band suffices. In addition, a transmitted signal is hardly subjected to a transmission distortion.

Generally, an OFDM signal is generated by an inverse fast Fourier transform circuit (an IFFT circuit). In the case where a data sequence has a length N equal to $2^L$, the IFFT circuit divides discrete Fourier transform (DFT) of a size N into DFT's of a size N/2, and executes butterfly operations on a multiplexed basis. When an order number is "k", a digital value to be transmitted is fed to real-part and imaginary-part circuit terminals corresponding to "k" so that a signal for transmitting the digital value is generated. Inverse DFT using N complex numbers is implemented during a time interval T, and thereby an OFDM signal is generated. Points of the inverse DFT correspond to multiple carriers respectively.

The information-containing multiple carriers generated by the IFFT circuit are equivalent to the results of modulation of carriers in accordance with information pieces to be transmitted respectively. Since the OFDM signal is a time division multiplexed combination of the information-containing carriers, the OFDM signal has a form as a random signal.

The instantaneous electric power of such an OFDM signal has a chance of peaking to a great value. In the case of an OFDM signal using 256 information-containing carriers having equal electric powers, the instantaneous electric power of the OFDM signal is maximized to 65,536 ($256^2$) times the electric power of one information-containing carrier when peak amplitudes of the 256 information-containing carriers occur at a same moment. In the case where the electric power of one information-containing carrier is 1 mW, the possible instantaneous peak electric power of the OFDM signal is about 65 W although, the mean electric power thereof is about 256 mW.

Accordingly, a prior-art OFDM signal generating and transmitting apparatus uses an RF power amplifier which is capable of generating an RF signal having an electric power much greater than a mean electric power of a handled OFDM signal. For example, in the case where the electric power of one of 256 information-containing carriers is 1 mW, the RF power amplifier is designed to generate an RF signal having an electric power up to 2.5 W–5 W. In other words, the RF power amplifier can generate a great-power RF signal without being saturated. Generally, a great-power RF amplifier tends to be expensive and large in size.

SUMMARY OF THE INVENTION

It is a first object of this invention to provide an improved apparatus for generating a frequency division multiplexed signal.

It is a second object of this invention to provide an improved decoding apparatus for a frequency division multiplexed signal.

It is a third object of this invention to provide an improved method of generating a frequency division multiplexed signal.

It is a fourth object of this invention to provide an improved decoding method for a frequency division multiplexed signal.

A first aspect of this invention provides an apparatus for generating a frequency division multiplexed signal which comprises an IDFT section having a set of input terminals subjected to components of an information signal respectively, the information signal representing information to be transmitted, the IDFT section subjecting the information signal to inverse discrete Fourier transform to convert the information signal into a pair of a first in-phase signal and a first quadrature signal while assignment of the components of the information signal to the input terminals is in a first state; an output buffer memory; first means for calculating a first power-related value of at least one of the first in-phase signal and the first quadrature signal; second means for deciding whether or not the calculated first power-related value exceeds a predetermined reference value; third means for writing the first in-phase signal and the first quadrature signal into the output buffer memory when the second means decides that the calculated first power-related value does not exceed the predetermined reference value; fourth means for changing the assignment of the components of the information signal to the input terminals from the first state to a second state different from the first state when the second means decides that the calculated first power-related value exceeds the predetermined reference value; the IDFT section subjecting the information signal to inverse discrete Fourier transform to convert the information signal into a pair of a second in-phase signal and a second quadrature signal while the assignment of the components of the information signal to the input terminals is in the second state; the first means being operative for calculating a second power-related value of at least one of the second in-phase signal and the second quadrature signal; the second means being operative for deciding whether or not the calculated second power-related value exceeds the predetermined reference value; and the third means being operative for writing the second in-phase signal and the second quadrature signal into the output buffer memory when the second means decides that the calculated second power-related value does not exceed the predetermined reference value.

A second aspect of this invention is based on the first aspect thereof, and provides an apparatus further comprising the fourth means being operative for changing the assignment of the components of the information signal to the input terminals from the second state to a third state different from the first state and the second state when the second means decides that the calculated second power-related value exceeds the predetermined reference value; the IDFT section subjecting the information signal to inverse discrete Fourier, transform to convert the information signal into a pair of a third in-phase signal and a third quadrature signal while the assignment of the components of the information signal to the input terminals is in the third state; the first means being operative for calculating a third power-related value of at least one of the third in-phase signal and the third quadrature signal; the second means being operative for deciding whether or not the calculated third power-related value exceeds the predetermined reference value; the third means being operative for writing the third in-phase signal and the third quadrature signal into the output buffer memory when the second means decides that the calculated third power-related value does not exceed the predetermined reference value; fifth means for deciding which of the calculated first power-related value, the calculated second power-related value, and the calculated third power-related value is the smallest when the second means decides that the calculated first power-related value, the calculated second power-related value, and the calculated third power-related value exceed the predetermined reference value; and the third means being operative for writing the first in-phase signal and the first quadrature signal into the output buffer memory when the fifth means decides that the calculated first power-related value is the smallest, being operative for writing the second in-phase signal and the second quadrature signal into the output buffer memory when the fifth means decides that the calculated second power-related value is the smallest, and being operative for writing the third in-phase signal and the third quadrature signal into the output buffer memory when the fifth means decides that the calculated third power-related value is the smallest.

A third aspect of this invention provides an apparatus for generating a frequency division multiplexed signal which comprises an IDFT section having a first input terminal and a set of second input terminals, the first input terminal being subjected to a first signal representing a transmission mode, the second input terminals being subjected to components of a second signal representing main information to be transmitted respectively, the IDFT section subjecting the first signal and the second signal to inverse discrete Fourier transform to convert the first signal and the second signal into a pair of a first in-phase signal and a first quadrature signal while assignment of the components of the second signal to the second input terminals is in a first state; an output buffer memory; first means for calculating a first power-related value of at least one of the first in-phase signal and the first quadrature signal; second means for deciding whether or not the calculated first power-related value exceeds a predetermined reference value; third means for writing the first in-phase signal and the first quadrature signal into the output buffer memory when the second means decides that the calculated first power-related value does not exceed the predetermined reference value; fourth means for changing the assignment of the components of the second signal to the second input terminals from the first state to a second state different from the first state when the second means decides that the calculated first power-related value exceeds the predetermined reference value; the IDFT section subjecting the first signal and the second signal to inverse discrete Fourier transform to convert the first signal and the second signal into a pair of a second in-phase signal and a second quadrature signal while the assignment of the components of the second signal to the second input terminals is in the second state; the first means being operative for calculating a second power-related value of at least one of the second in-phase signal and the second quadrature signal; the second means being operative for deciding whether or not the calculated second power-related value exceeds the predetermined reference value; the third means being operative for writing the second in-phase signal and the second quadrature signal into the output buffer memory when the second means decides that the calculated second power-related value does not exceed the predetermined reference value; and fifth means for enabling the first signal to contain information of the assignment of the components of the second signal to the second input terminals.

A fourth aspect of this invention is based on the third aspect thereof, and provides an apparatus further comprising the fourth means for changing the assignment of the components of the second signal to the second input terminals from the second state to a third state different from the first state and the second state when the second means decides that the calculated second power-related value exceeds the predetermined reference value; the IDFT section subjecting the first signal and the second signal to inverse discrete Fourier transform to convert the first signal and the second signal into a pair of a third in-phase signal and a third quadrature signal while the assignment of the components of the second signal to the second input terminals is in the third state; the first means being operative for calculating a third power-related value of at least one of the third in-phase signal and the third quadrature signal; the second means being operative for deciding whether or not the calculated third power-related value exceeds the predetermined reference value; the third means being operative for writing the third in-phase signal and the third quadrature signal into the output buffer memory when the second means decides that the calculated third power-related value does not exceed the predetermined reference value; sixth means for deciding which of the calculated first power-related value, the calculated second power-related value, and the calculated third power-related value is the smallest when the second means decides that the calculated first power-related value, the calculated second power-related value, and the calculated third power-related value exceed the predetermined reference value; and the third means being operative for writing the first in-phase signal and the first quadrature signal into the output buffer memory when the sixth means decides that the calculated first power-related value is the smallest, being operative for writing the second in-phase signal and the second quadrature signal into the output buffer memory when the sixth means decides that the calculated second power-related value is the smallest, and being operative for writing the third in-phase signal and the third quadrature signal into the output buffer memory when the sixth means decides that the calculated third power-related value is the smallest.

A fifth aspect of this invention provides a decoding apparatus for a frequency division multiplexed signal including a first signal and a second signal, the first signal representing a transmission mode containing information of assignment of components of the second signal to input terminals of an IDFT section in a transmitter side, the second signal representing main information, the apparatus comprising a DFT section subjecting the frequency division multiplexed signal to discrete Fourier transform to convert the frequency division multiplexed signal into the first signal and a third signal representing the main information; and means for rearranging components of the third signal in response to the assignment information in the first signal to convert the third signal into the second signal.

A sixth aspect of this invention provides a method of generating a frequency division multiplexed signal which comprises the steps of subjecting digital information signals to inverse discrete Fourier transform to generate a frequency division multiplexed signal having carriers modulated with the digital information signals respectively; dividing a calculation result of a second latest stage of the inverse discrete Fourier transform into a former half and a latter half; implementing a first final stage of the inverse discrete Fourier transform to generate a first final-stage calculation result F1(t) while maintaining the former half as it is and setting the latter half to zero; implementing a second final stage of the inverse discrete Fourier transform to generate a second final-stage calculation result F2(t) while setting the former half to zero and maintaining the latter half as it is; deciding whether or not an absolute value of a sum of the first final-stage calculation result F1(t) and the second final-stage calculation result F2(t) exceeds a predetermined reference value; and shifting the second final-stage calculation result F2(t) along a time base to convert the second final-stage calculation result F2(t) into a modified second final-stage calculation result F2(t)', and adding the first final-stage calculation result F1(t) and the modified second final-stage calculation result F2(t)' to generate the frequency division multiplexed signal in cases where the absolute value of the sum of the first final-stage calculation result F1(t) and the second final-stage calculation result F2(t) exceeds the predetermined reference value.

A seventh aspect of this invention provides a method of generating a frequency division multiplexed signal which comprises the steps of subjecting digital information signals to inverse discrete Fourier transform to generate a frequency division multiplexed signal having carriers modulated with the digital information signals respectively; dividing a calculation result of a {(final stage)−X}-th stage of the inverse discrete Fourier transform into $2^X$ blocks; implementing X subsequent stages of the inverse discrete Fourier transform to generate a final-stage calculation result while maintaining one of the blocks as it is and setting the other blocks to zero; changing said one through the blocks during the implementing step to generate $2^X$ final-stage calculation results; deciding whether or not an absolute value of a sum of the $2^X$ final-stage calculation results exceeds a predetermined reference value; and shifting at least one of the $2^X$ final-stage calculation results along a time base to convert said one of the $2^X$ final-stage calculation results into a modified final-stage calculation result, and adding others of the $2^X$ final-stage calculation results and the modified final-stage calculation result to generate the frequency division multiplexed signal in cases where the absolute value of the sum of the $2^X$ final-stage calculation results exceeds the predetermined reference value.

An eighth aspect of this invention is based on the sixth aspect thereof, and provides a method further comprising the step of multiplying the second final-stage calculation result F2(t) by a given value when the second final-stage calculation result F2(t) is shifted along the time base.

A ninth aspect of this invention is based on the seventh aspect thereof, and provides a method further comprising the step of multiplying said one of the $2^X$ final-stage calculation results by a given value when said one of the $2^X$ final-stage calculation results is shifted along the time base.

A tenth aspect of this invention is based on the sixth aspect thereof, and provides a method further comprising the steps of providing a carrier hole in the frequency division multiplexed signal; generating a reference signal representing information of said shifting and having a frequency corresponding to the carrier hole; and adding the reference signal to the frequency division multiplexed signal.

An eleventh aspect of this invention is based on the seventh aspect thereof, and provides a method further comprising the steps of providing a carrier hole in the frequency division multiplexed signal; generating a reference signal representing information of said shifting and having a frequency corresponding to the carrier hole; and adding the reference signal to the frequency division multiplexed signal.

A twelfth aspect of this invention is based on the sixth aspect thereof, and provides a method further comprising the steps of specifying one of the carriers; generating a reference signal representing information of said shifting; and modulating said specified one of the carriers with the reference signal.

A thirteenth aspect of this invention is based on the seventh aspect thereof, and provides a method further comprising the steps of specifying one of the carriers; generating a reference signal representing information of said shifting; and modulating said specified one of the carriers with the reference signal.

A fourteenth aspect of this invention provides a decoding method for a frequency division multiplexed signal including a main information signal and a reference signal, the main information signal representing main information, the reference signal representing data shift executed in inverse discrete Fourier transform in a transmitter side, the method comprising the steps of subjecting the frequency division multiplexed signal to discrete Fourier transform to convert the frequency division multiplexed signal into the main information signal; extracting the reference signal from the frequency division multiplexed signal; and controlling the discrete Fourier transform in response to the extracted reference signal to correctly recover the main information signal.

A fifteenth aspect of this invention provides an apparatus for generating a frequency division multiplexed signal which comprises means for subjecting digital information signals to inverse discrete Fourier transform to generate a frequency division multiplexed signal having carriers modulated with the digital information signals respectively;

means for dividing a calculation result of a second latest stage of the inverse discrete Fourier transform into a former half and a latter half; means for implementing a first final stage of the inverse discrete Fourier transform to generate a first final-stage calculation result F1(t) while maintaining the former half as it is and setting the latter half to zero; means for implementing a second final stage of the inverse discrete Fourier transform to generate a second final-stage calculation result F2(t) while setting the former half to zero and maintaining the latter half as it is; means for deciding whether or not an absolute value of a sum of the first final-stage calculation result F1(t) and the second final-stage calculation result F2(t) exceeds a predetermined reference value; and means for shifting the second final-stage calculation result F2(t) along a time base to convert the second final-stage calculation result F2(t) into a modified second final-stage calculation result F2(t)', and adding the first final-stage calculation result F1(t) and the modified second final-stage calculation result F2(t)' to generate the frequency division multiplexed signal in cases where the absolute value of the sum of the first final-stage calculation result F1(t) and the second final-stage calculation result F2(t) exceeds the predetermined reference value.

A sixteenth aspect of this invention provides an apparatus for generating a frequency division multiplexed signal which comprises means for subjecting digital information signals to inverse discrete Fourier transform to generate a frequency division multiplexed signal having carriers modulated with the digital information signals respectively; means for dividing a calculation result of a {(final stage)−X}-th stage of the inverse discrete Fourier transform into $2^X$ blocks; means for implementing X subsequent stages of the inverse discrete Fourier transform to generate a final-stage calculation result while maintaining one of the blocks as it is and setting the other blocks to zero; means for changing said one through the blocks during the implementing step to generate $2^X$ final-stage calculation results; means for deciding whether or not an absolute value of a sum of the $2^X$ final-stage calculation results exceeds a predetermined reference value; and means for shifting at least one of the $2^X$ final-stage calculation results along a time base to convert said one of the $2^X$ final-stage calculation results into a modified final-stage calculation result, and adding others of the $2^X$ final-stage calculation results and the modified final-stage calculation result to generate the frequency division multiplexed signal in cases where the absolute value of the sum of the $2^X$ final-stage calculation results exceeds the predetermined reference value.

A seventeenth aspect of this invention is based on the fifteenth aspect thereof, and provides an apparatus further comprising means for multiplying the second final-stage calculation result F2(t) by a given value when the second final-stage calculation result F2(t) is shifted along the time base.

An eighteenth aspect of this invention is based on the sixteenth aspect thereof, and provides an apparatus further comprising means for multiplying said one of the $2^X$ final-stage calculation results by a given value when said one of the $2^X$ final-stage calculation results is shifted along the time base.

A nineteenth aspect of this invention is based on the fifteenth aspect thereof, and provides an apparatus further comprising means for providing a carrier hole in the frequency division multiplexed signal; means for generating a reference signal representing information of said shifting and having a frequency corresponding to the carrier hole; and means for adding the reference signal to the frequency division multiplexed signal.

A twentieth aspect of this invention is based on the sixteenth aspect thereof, and provides an apparatus further comprising means for providing a carrier hole in the frequency division multiplexed signal; means for generating a reference signal representing information of said shifting and having a frequency corresponding to the carrier hole; and means for adding the reference signal to the frequency division multiplexed signal.

A twenty-first aspect of this invention is based on the fifteenth aspect thereof, and provides an apparatus further comprising means for specifying one of the carriers; means for generating a reference signal representing information of said shifting; and means for modulating said specified one of the carriers with the reference signal.

A twenty-second aspect of this invention is based on the sixteenth aspect thereof, and provides an apparatus further comprising means for specifying one of the carriers; means for generating a reference signal representing information of said shifting; and means for modulating said specified one of the carriers with the reference signal.

A twenty-third aspect of this invention provides a decoding apparatus for a frequency division multiplexed signal including a main information signal and a reference signal, the main information signal representing main information, the reference signal representing data shift executed in inverse discrete Fourier transform in a transmitter side, the apparatus comprising means for subjecting the frequency division multiplexed signal to discrete Fourier transform to convert the frequency division multiplexed signal into the main information signal; means for extracting the reference signal from the frequency division multiplexed signal; and means for controlling the discrete Fourier transform in response to the extracted reference signal to correctly recover the main information signal.

BRIEF DESCRIPTION OF THE DRAWINGS

FIG. 5 is a diagram of a first type of the assignment of data pieces to carriers in the first embodiment of this invention.

FIG. 6 is a diagram of a second type of the assignment of data pieces to carriers in the first embodiment of this invention.

FIG. 7 is a diagram of a first type of the assignment of data pieces to carriers in a second embodiment of this invention.

FIG. 8 is a diagram of a second type of the assignment of data pieces to carriers in a second embodiment of this invention.

FIG. 9 is a diagram of a third type of the assignment of data pieces to carriers in a second embodiment of this invention.

FIG. 13 is a diagram of data pieces which occur before a shifting process, and data pieces which occur after the shifting process in the third embodiment of this invention.

FIG. 14 is a signal flow diagram of a third stage of inverse discrete Fourier transform in the third embodiment of this invention.

FIG. 15 is a signal flow diagram of an assumed second stage of inverse discrete Fourier transform.

FIG. 16 is a signal flow diagram of first and second stages of inverse discrete Fourier transform in the third embodiment of this invention.

FIG. 17 is a signal flow diagram of assumed first and second stages of inverse discrete Fourier transform.

FIG. 19 is a diagram of calculation results of stages of inverse discrete Fourier transform in a fourth embodiment of this invention.

FIG. 20 is a diagram of the relation between shift-resultant transmitted data pieces and received data pieces in the fourth embodiment of this invention.

DESCRIPTION OF THE PREFERRED EMBODIMENTS

First Embodiment

Figure 1:
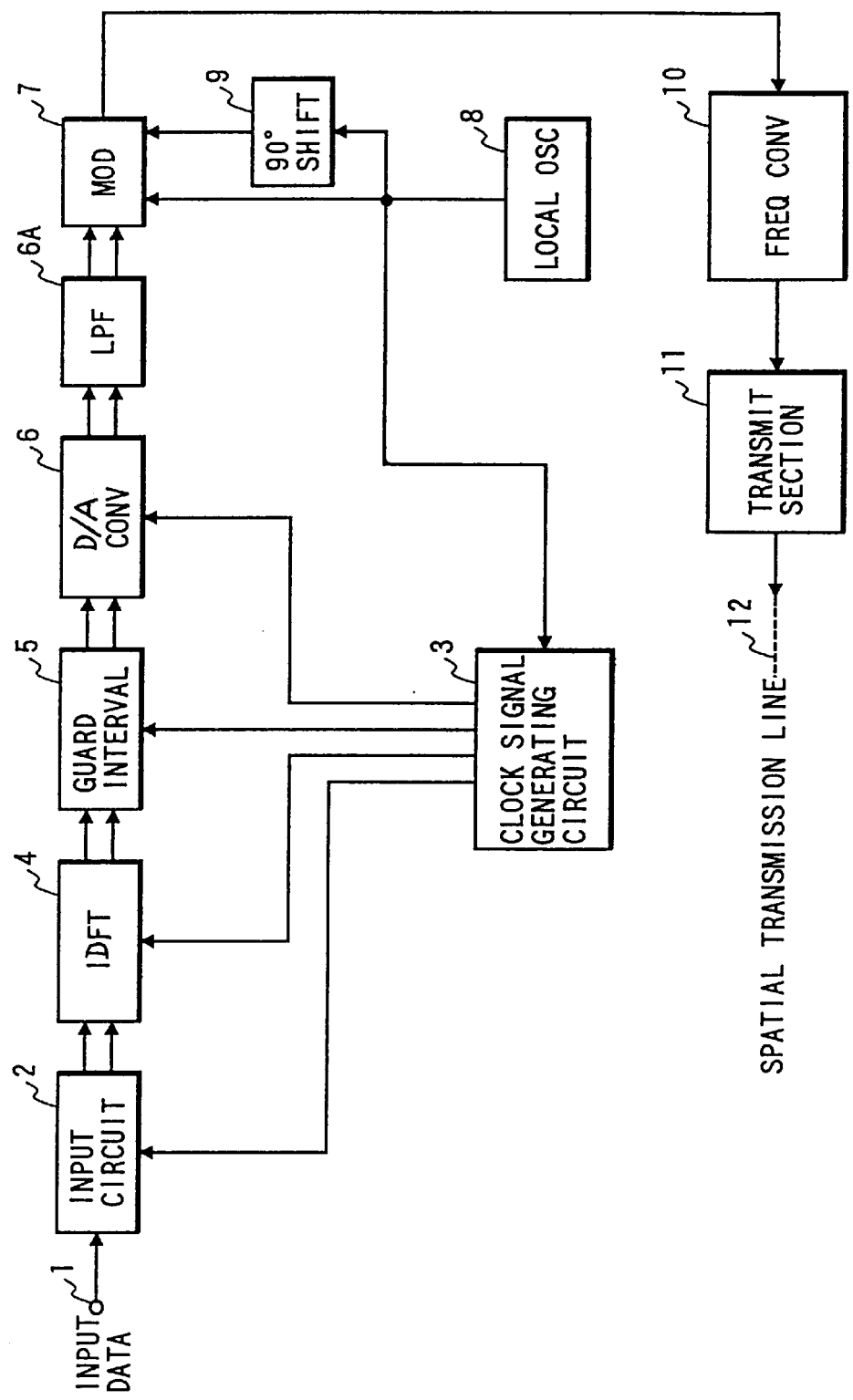
FIG. 1 is a block diagram of a signal transmitting apparatus according to a first embodiment of this invention.

FIG. 1 shows a signal transmitting apparatus using orthogonal frequency division multiplexing (OFDM) according to a first embodiment of this invention. Digital data transmitted by the signal transmitting apparatus of FIG. 1 is equal to, for example, a compressed video signal and a compressed audio signal.

OFDM uses multiple carriers having an orthogonal relationship with each other. In OFDM data transmission, independent digital information pieces are transmitted by using multiple carriers respectively. Since the carriers are orthogonal with each other, the levels of the spectrums of carriers neighboring a given carrier are nullified at a point corresponding to the frequency of the given carrier.

An IDFT (inverse discrete Fourier transform) circuit is used to generate a set of multiple orthogonal carriers. A baseband OFDM signal can be generated by executing inverse discrete Fourier transform (IDFT) using N complex numbers during a time interval T. Points of the inverse DFT correspond to modulation signal outputs respectively.

An example of basic specifications of the signal transmitting apparatus of FIG. 1 is as follows. The central carrier frequency in an RF band is equal to 100 MHz. The number of carriers for data transmission is equal to 248. The modulation is of the 256-QAM OFDM type. The number of used carriers is equal to 257. The used carriers are spaced at equal frequency intervals.

With reference to FIG. 1, a digital information signal in the form of a bit stream is fed via an input terminal 1 to an input circuit 2. The digital information signal represents main information to be transmitted. The digital information signal results from, for example, compressing an audio information signal or a video information signal according to an MPEG encoding process. The input circuit 2 adds an error correction code to the digital information signal in response to a clock signal fed from a clock signal generating circuit 3.

The input circuit 2 subjects the resultant digital information signal to serial-to-parallel (S/P) conversion in response to the clock signal fed from the clock signal generating circuit 3. During the S/P conversion, the digital information signal is divided into blocks corresponding to modulating signals for 256 QAM. The input circuit 2 outputs the modulating signals. According to 256 QAM, 16 different levels are defined in an amplitude direction while 16 different levels are defined in an angle direction. In addition, 256 different digital states are assigned to the 256 levels (16 levels multiplied by 16 levels) respectively.

As previously described, 248 carriers among 257 carriers are used for transmitting main data (main information). The 9 remaining carriers are used for transmitting reference signals (reference data). The reference signals include calibration signals representing reference data which can be used by a receiver side for amplitude correction and phase correction. The reference signals also include sync signals, pilot signals, and a transmission mode signal.

The input circuit 2 outputs 248-byte digital data for every 1-symbol interval. In more detail, the input circuit 2 outputs a first set of 248 parallel digital signals each having 4 bits, and a second set of 248 parallel digital signals each having 4 bits for every 1-symbol interval. The first set and the second set correspond to a real part and an imaginary part (an in-phase signal and a quadrature signal, that is, an I signal and a Q signal) respectively.

The 248 output signals from the input circuit 2 in each of the real part and the imaginary part are fed to an IDFT (inverse discrete Fourier transform) device 4. The IDFT device 4 operates in response to a clock signal fed from the clock signal generating circuit 3. The IDFT device 4 is of the type capable of processing N parallel signals, where N denotes a natural number equal to 512 which is defined as a period. A main portion of the IDFT device 4 has a set of 512 input terminals for the real part and also a set of 512 input terminals for the imaginary part. The 248 output signals from the input circuit 2 in the real part are applied to 248 IDFT-device input terminals among the 512 input terminals for the real part, respectively. The 248 output signals from the input circuit 2 in the imaginary part are applied to 248 IDFT-device input terminals among the 512 input terminals for the imaginary part, respectively. Regarding each of the real part and the imaginary part, a major portion of the operation of the IDFT device 4 corresponds to subjecting 248 carriers to 256 QAM responsive to the 248 output signals from the input circuit 2 respectively. Regarding the 248 output signals from the input circuit 2, the IDFT device 4 generates the 248 modulation-resultant signals in each of the real part and the imaginary part. The IDFT device 4 combines the 248 modulation-resultant signals and other modulation-resultant signals of the real part into a multiplexing-resultant signal corresponding to the real part. The IDFT device 4 outputs the multiplexing-resultant signal corresponding to the real part. Also, the IDFT device 4 combines the 248 modulation-resultant signals and other modulation-resultant signals of the imaginary part into a multiplexing-resultant signal corresponding to the imaginary part. The IDFT device 4 outputs the multiplexing-resultant signal corresponding to the imaginary part.

The 512 input terminals of the main portion of the IDFT device 4 for each of the real part and the imaginary part correspond to 512 different carriers respectively. Real-part information pieces applied to the input terminals of the main portion of the IDFT device 4 for the real part and imaginary-part information pieces applied to the input terminals of the main portion of the IDFT device 4 for the imaginary part are transmitted by the corresponding carriers respectively.

The 512 input terminals of the main portion of the IDFT device 4 for each of the real part and the imaginary part are sequentially numbered as "n=0, 1, 2, 3, . . . , 510, 511". The 0-th input terminals (n=0) of the main portion of the IDFT device 4 for the real part and the imaginary part correspond to a central-frequency carrier. A given dc voltage is applied to the 0-th input terminals (n=0) of the main portion of the IDFT device 4 for the real part and the imaginary part to enable the central-frequency carrier to represent a reference signal. The 1-st input terminals (n=1) to the 128-th input terminals (n=127) of the main portion of the IDFT device 4 for the real part and the imaginary part correspond to 128 carriers located in an upper side of the central-frequency carrier.

The 384-th input terminals (n=384) to the 511-th input terminals (n=511) of the main portion of the IDFT device 4 for the real part and the imaginary part correspond to 128 carriers located in a lower side of the central-frequency carrier. The 128-th input terminals (n=128) and the 384-th input terminals (n=384) of the main portion of the IDFT device 4 for the real part and the imaginary part correspond to edge-frequency carriers having given simple relations with a Nyquist frequency. A fixed voltage is applied to the 128-th input terminals (n=128) and the 384-th input terminals (n=384) of the main portion of the IDFT device 4 for the real part and the imaginary part to enable the edge-frequency carriers to represent pilot signals. The 248 output signals from the input circuit 2 in the real part are applied to 248 input terminals among the 1-st input terminals (n=1) to the 127-th input terminals (n=127) and the 385-th input terminals (n=385) to the 511-th input terminals (n=511) of the main portion of the IDFT device 4 for the real part, respectively. The 248 output signals from the input circuit 2 in the imaginary part are applied to 248 input terminals among the 1-st input terminals (n=1) to the 127-th input terminals (n=127) and the 385-th input terminals (n=385) to the 511-th input terminals (n=511) of the main portion of the IDFT device 4 for the imaginary part, respectively. Thus, the 248 output signals from the input circuit 2 in each of the real part and the imaginary part are transmitted by the 248 carriers respectively. A ground potential or a signal of "0" is applied to the 129-th input terminals (n=129) to the 383-rd input terminals (n=383) of the main portion of the IDFT device 4 for each of the real part and the imaginary part to nullify the corresponding carriers.

As understood from the previous description, 257 carriers among the 512 carriers are used while the other carriers are prevented from occurring. The 257 carriers are grouped into a set of 248 carriers for the transmission of main data (main information) and a set of 9 carriers for the transmission of reference signals including a transmission mode signal. The transmission mode signal is applied to a pair of specified input terminals out of the 1-st input terminals (n=1) to the 127-th input terminals (n=127) and the 385-th input terminals (n=385) to the 511-th input terminals (n=511) of the main portion of the IDFT device 4 for the real part and the imaginary part.

As will be described later, in each of the real part and the imaginary part, the assignment of the 248 output signals from the input circuit 2 to the 248 input terminals of the main portion of the IDFT device 4 can be changed. The transmission mode signal contains information representing the current condition of the assignment.

The output signals of the IDFT device 4 are fed to a guard interval setting circuit 5. The guard interval setting circuit 5 provides a guard interval of a given length for every symbol of the output signals of the IDFT device 4. The guard intervals are designed to reduce multipath distortions caused by a transmission line. The guard interval setting circuit 5 operates in response to a clock signal fed from the clock signal generating circuit 3.

Output signals of the guard interval setting circuit 5 are fed to a D/A converter 6, being converted into corresponding analog signals thereby. The D/A converter 6 operates in response to a clock signal fed from the clock signal generating circuit 3. The D/A converter 6 outputs the resultant analog signals to an LPF (a low pass filter) 6A. Only components of the output signals of the D/A converter 6 in a desired frequency band are passed through the LPF 6A.

Output signals of the LPF 6A which correspond to the real part and the imaginary part are fed to a quadrature modulator 7 as baseband signals. A local oscillator 8 outputs a given-frequency signal, for example, a 10.7-MHz signal, to the quadrature modulator 7. The frequency of the output signal of the local oscillator 8 corresponds to a given intermediate frequency (IF). The local oscillator 8 also outputs the given-frequency signal to a 90° phase shifter 9. The device 9 shifts the phase of the given-frequency signal by 90°, and outputs the phase-shift resultant signal to the quadrature modulator 7. In this way, a pair of given-frequency signals having a quadrature relation are fed to the quadrature modulator 7. In the quadrature modulator 7, the quadrature given-frequency signals are modulated in accordance with the baseband signals outputted from the LPF 6A so that the baseband signals are converted into an IF OFDM (intermediate frequency OFDM) signal. The IF OFDM signal has multiple IF orthogonal carriers which are modulated as indications of the output baseband signals of the LPF 6A.

The IF OFDM signal is outputted from the quadrature modulator 7 to a frequency converter 10. The IF OFDM signal is changed by the frequency converter 10 into an RF OFDM (radio frequency OFDM) signal in a desired frequency band for transmission. The central frequency of the RF OFDM signal is equal to 100 MHz. The RF OFDM signal has multiple RF orthogonal carriers which are modulated as indications of the output baseband signals of the LPF 6A respectively. The frequency converter 10 includes a local oscillator and a mixer. In the frequency converter 10, the IF OFDM signal and the output signal of the local oscillator are mixed by the mixer so that the IF OFDM signal is converted into the RF OFDM signal.

The RF OFDM signal is fed to a transmitting section 11 from the frequency converter 10. The transmitting section 11 includes a linear power amplifier and a transmission antenna. The RF OFDM signal is fed via the linear power amplifier to the transmission antenna, being radiated by the transmission antenna into a transmission line (the air) 12.

The output signal of the local oscillator 8 is also fed to the clock signal generating circuit 3. The circuit 3 generates clock signals in response to the output signal of the local oscillator 8 by frequency dividing processes, and outputs the generated clock signals to the input circuit 2, the IDFT device 4, the guard interval setting circuit 5, and the D/A converter 6 as operation timing control signals respectively.

Figure 2:
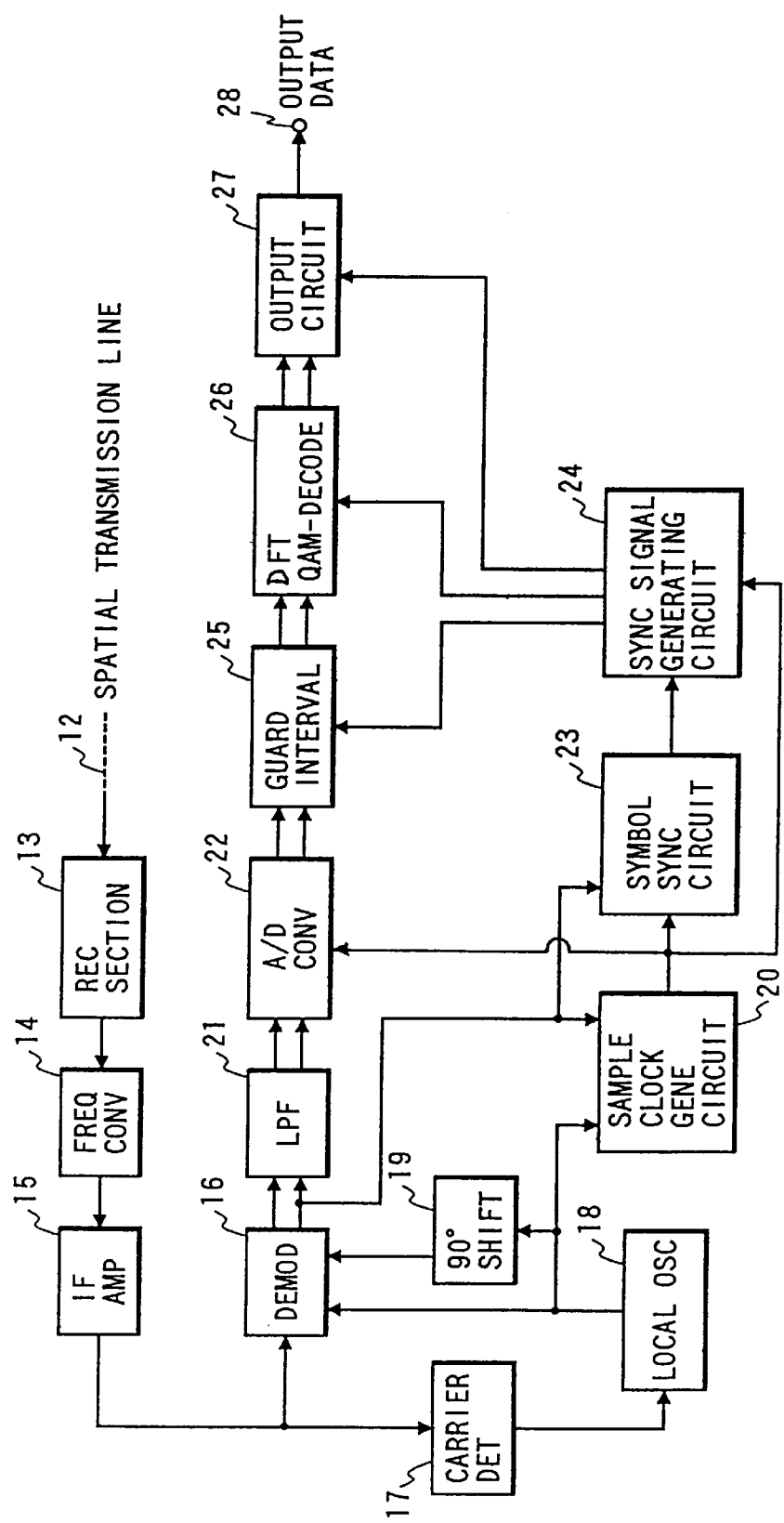
FIG. 2 is a block diagram of a signal receiving apparatus according to the first embodiment of this invention.

FIG. 2 shows a signal receiving apparatus using orthogonal frequency division multiplexing (OFDM) according to the first embodiment of this invention. The signal receiving apparatus of FIG. 2 is able to accept an RF OFDM signal transmitted by the signal transmitting apparatus of FIG. 1.

With reference to FIG. 2, a receiving section 13 includes a reception antenna which catches an RF OFDM signal transmitted from, for example, the signal transmitting apparatus of FIG. 1 via the transmission line (the air) 12. The central frequency of the RF OFDM signal is equal to 100

MHz. The RF OFDM signal has multiple RF orthogonal carriers which are modulated in accordance with transmitted baseband signals respectively. The receiving section 13 includes an RF amplifier which enlarges the caught RF OFDM signal.

An output RF OFDM signal from the RF amplifier in the receiving section 13 is fed to a frequency converter 14, being converted into a corresponding IF OFDM signal thereby. The central frequency of the IF OFDM signal is equal to 10.7 MHz. The IF OFDM signal has multiple IF orthogonal carriers which are modulated in accordance with transmitted baseband signals respectively. The frequency converter 14 includes a local oscillator and a mixer. In the frequency converter 14, the RF OFDM signal and the output signal of the local oscillator are mixed by the mixer so that the RF OFDM signal is converted into the IF OFDM signal.

The IF OFDM signal is fed from the frequency converter 14 to an IF amplifier 15, being enlarged to a desired level thereby. The output IF OFDM signal from the IF amplifier 15 is fed to a quadrature demodulator 16 and a carrier detecting circuit 17.

The carrier detecting circuit 17 includes a PLL (phase locked loop) circuit having a combination of a phase comparator (a multiplier), an LPF, a VCO (voltage-controlled oscillator), and a ¼ frequency divider. The PLL circuit recovers the carriers in the IF OFDM signal. An output signal of the carrier detecting circuit 17, which corresponds to the recovered carriers, is fed to a local oscillator 18. The local oscillator 18 is designed to extract the central-frequency carrier among the carriers in the IF OFDM signal with a negligible phase error. The local oscillator 18 outputs a signal corresponding to the extracted central-frequency carrier. Thus, the local oscillator 18 reproduces a local oscillator signal used in a transmitter side.

In this embodiment, the IF OFDM signal (or the RF OFDM signal) is based on the information-transmitting carriers with frequencies which are spaced at equal intervals. The frequencies of the information carriers neighboring the central carrier are spaced from the frequency of the central carrier by only a small frequency interval. Accordingly, it is preferable that the extraction of the central carrier is executed by a high-selectivity circuit.

The local oscillator 18 uses a high-selectivity circuit. Specifically, the local oscillator 18 includes a PLL circuit for extracting the central carrier from the carriers outputted by the carrier detecting circuit 17. A voltage-controlled oscillator (VCO) in the PLL circuit in the local oscillator 18 uses a voltage-controlled crystal oscillator (VCXO) which can oscillate at a frequency variable in a given small range (for example, ±200 Hz) around the frequency of the central carrier. In addition, an LPF in the PLL circuit has a cut-off frequency adequately low with respect to the frequency intervals between the carriers.

The output signal of the local oscillator 18 is fed to the quadrature demodulator 16. The output signal of the local oscillator 18 is also fed to a 90° phase shifter 19. The device 19 shifts the phase of the output signal of the local oscillator 18 by 90°. The phase-shift resultant signal is outputted from the device 19 to the quadrature demodulator 16. In this way, a pair of reproduced local oscillator signals having a quadrature relation are fed to the quadrature demodulator 16. In response to the quadrature signals, the IF OFDM signal is demodulated by the quadrature demodulator 16 into baseband signals corresponding to a real part and an imaginary part (an in-phase signal and a quadrature signal, that is, an I signal and a Q signal) respectively.

Output signals from the quadrature demodulator 16 are fed to an LPF 21. Only components of the output signals of the quadrature demodulator 16, which occupy a desired frequency band, are passed through the LPF 21. Output signals of the LPF 21 which have analog forms are fed to an A/D converter 22. The output signals of the LPF 21 are subjected to sampling processes and are converted by the A/D converter 22 into corresponding digital signals. The A/D converter 22 operates in response to a sample clock signal fed from a sample clock signal generating circuit 20.

One of the output signals of the quadrature demodulator 16 is fed to the sample clock signal generating circuit 20. The output signal of the local oscillator 18 is fed to the sample clock signal generating circuit 20. The sample clock signal generating circuit 20 includes a PLL circuit phase-locked with respect to a pilot signal in the output signal of the quadrature demodulator 16. It should be noted that the pilot signal is transmitted by specified carriers as a continuous signal during every symbol interval containing a guard interval. The sample clock signal generating circuit 20 derives pilot signal frequency information, and reproduces the pilot signal.

In a transmitter side, the frequency of the pilot signal is set to correspond to a given ratio between integers with respect to the frequency of the sample clock signal. The sample clock signal generating circuit 20 includes a frequency multiplier operating on the reproduced pilot signal at a multiplying factor corresponding to the above-indicated frequency ratio. A sample clock signal (a clock sync signal) is recovered through the frequency multiplication.

The output signals of the A/D converter 22 are fed to a guard interval processing circuit 25. The guard interval processing circuit 25 extracts time-portions of the output signals of the A/D converter 22 which occupy every effective symbol interval. The guard interval processing circuit 25 operates in response to a clock signal fed from a clock signal generating circuit 24. Output signals of the guard interval processing circuit 25 are fed to a DFT QAM (discrete Fourier transform, quadrature amplitude modulation) decoding circuit 26.

The DFT QAM decoding circuit 26 subjects the output signals of the guard interval processing circuit 25 to processing which corresponds to complex discrete Fourier transform. The DFT QAM decoding circuit 26 operates in response to a clock signal fed from the clock signal generating circuit 24. According to the complex discrete Fourier transform processing, the DFT QAM decoding circuit 26 derives the levels of baseband carriers in the real-part signal and the imaginary-part signal outputted from the guard interval processing circuit 25. In the DFT QAM decoding circuit 26, the derived real-part levels and the derived imaginary-part levels are compared with reference demodulation output levels so that the states of transmitted digital signals are determined. In this way, the transmitted digital information is recovered.

Output signals of the DFT QAM decoding circuit 26 which correspond to the recovered digital signals are fed to an output circuit 27. The output signals of the DFT QAM decoding circuit 26 are subjected by the output circuit 27 to parallel-to-serial (P/S) conversion, being rearranged and combined into a serial-form digital signal. The output circuit 27 operates in response to a clock signal fed from the clock signal generating circuit 24. The serial-form digital signal is transmitted from the output circuit 27 to an external device (not shown) via an output terminal 28.

One of the output signals of the quadrature demodulator 16 is fed to a symbol sync signal generating circuit 23. The sample clock signal is fed from the sample clock signal generating circuit 20 to the symbol sync signal generating circuit 23. The symbol sync signal generating circuit 23 detects conditions of the phase of the pilot signal in response to the sample clock signal, thereby reproducing a symbol sync signal.

The clock signal generating circuit 24 receives the sample clock signal from the sample clock signal generating circuit 20. The clock signal generating circuit 24 receives the symbol sync signal from the symbol sync signal generating circuit 23. The clock signal generating circuit 24 produces clock signals in response to the output signals of the sample clock signal generating circuit 20 and the symbol sync signal generating circuit 23. The clock signal generating circuit 24 feeds the produced clock signals to the guard interval processing circuit 25, the DFT QAM decoding circuit 26, and the output circuit 27 as operation timing control signals.

Figure 3:
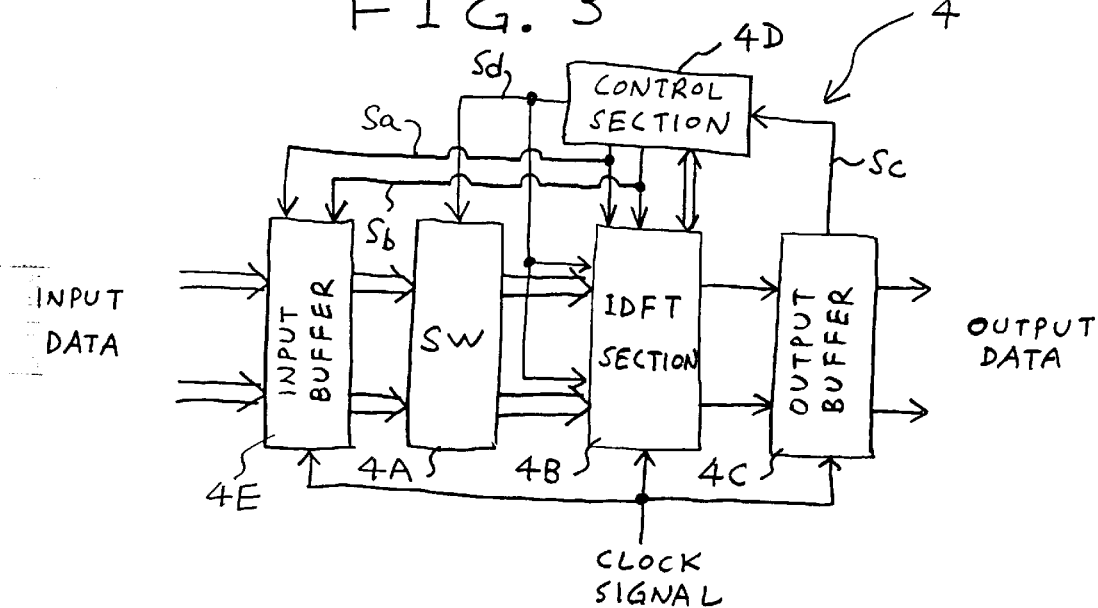
FIG. 3 is a block diagram of an IDFT device in FIG. 1.

As shown in FIG. 3, the IDFT device 4 includes a switch 4A, an IDFT section 4B, an output buffer memory 4C, a control section 4D, and an input buffer memory 4E. The IDFT section 4B corresponds to the main portion of the IDFT device 4. The IDFT section 4B and the control section 4D are formed by a digital signal processor (DSP) which has a combination of an input/output port, a processing section, a ROM, and a RAM. The IDFT section 4B and the control section 4D formed by the DSP operates in accordance with a program stored in the ROM.

The input buffer memory 4E is connected between the input circuit 2 and the switch 4A. The 248 output signals of the input circuit 2 for the real part and the 248 output signals of the input circuit 2 for the imaginary part are temporarily stored in the input buffer memory 4E before being fed to the switch 4A. The switch 4A has 248 input terminals for the real part which are subjected via the input buffer memory 4E to the 248 output signals from the input circuit 2 in the real part respectively. Also, the switch 4A has 248 input terminals for the imaginary part which are subjected via the input buffer memory 4E to the 248 output signals from the input circuit 2 in the imaginary part respectively. As will be made clear later, the reading of the signals from the input buffer memory 4E can be controlled by an output suspension signal Sa and an output requirement signal Sb fed from the control section 4D. It is preferable that the capacity of the input buffer memory 4E corresponds to about 10 symbols. The input buffer memory 4E operates in response to the clock signal fed from the clock signal generating circuit 3. The switch 4A has 248 output terminals for the real part which lead to respective 248 input terminals among 512 input terminals of the IDFT section 4B for the real part. Also, the switch 4A has 248 output terminals for the imaginary part which lead to respective 248 input terminals among 512 input terminals of the IDFT section 4B for the imaginary part. For each of the real part and the imaginary part, the switch 4A connects its 248 input terminals and its 248 output terminals. For each of the real part and the imaginary part, the switch 4A changes the connection between its 248 input terminals and its 248 output terminals in response to a control signal Sd outputted from the control section 4D.

The control signal Sd is applied to a pair of specified real-part and imaginary-part input terminals of the IDFT section 4B as a transmission mode signal. In addition, reference voltages or fixed voltages are applied to pairs of specified real-part and imaginary-part input terminals of the IDFT section 4B to generate reference signals. Regarding each of the real part and the imaginary part, the IDFT section 4B executes an IDFT-based multiplexing/modulating process on the 248 output signals from the input circuit 2, the transmission mode signal, and the reference voltages or the fixed voltages (corresponding to the reference signals). The IDFT section 4B generates and outputs a multiplexing-resultant signal corresponding to the real part and a multiplexing-resultant signal corresponding to the imaginary part. The IDFT section 4B stores the real-part multiplexing resultant signal and the imaginary-part multiplexing resultant signal into the output buffer memory 4C when given power conditions are met. The IDFT section 4B informs the control section 4D of the real-part multiplexing resultant signal and the imaginary-part multiplexing resultant signal. The IDFT section 4B operates in response to the clock signal fed from the clock signal generating circuit 3.

The output buffer memory 4C temporarily holds the real-part multiplexing resultant signal and the imaginary-part multiplexing resultant signal, and outputs the real-part multiplexing resultant signal and the imaginary-part multiplexing resultant signal to the guard interval setting circuit 5. The output buffer memory 4C operates in response to the clock signal fed from the clock signal generating circuit 3. The output buffer memory 4C generates a signal Sc representing the amount of effective data therein, that is, the ratio between an occupied area and an unoccupied area therein. The output buffer memory 4C feeds the data-amount signal Sc to the control section 4D. It is preferable that the capacity of the output buffer memory 4C corresponds to about 10 symbols.

Figure 4:
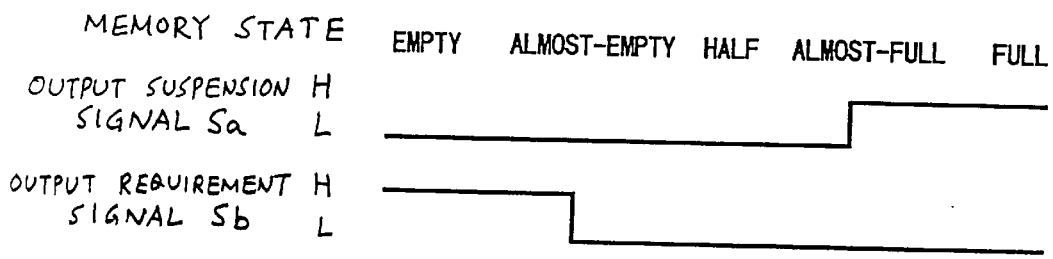
FIG. 4 is a diagram of the relation among the state of an output suspension signal, the state of an output requirement signal, and the amount of effective data in an output buffer memory in the IDFT device of FIG. 3.

The control section 4D is programmed to generate the output suspension signal Sa and the output requirement signal Sb in response to the data-amount signal Sc. Specifically, the control section 4D decides whether the output buffer memory 4C is in an empty state, an almost empty state, a half state (an intermediately occupied state), an almost full state, or a full state by referring to the data-amount signal Sc. As shown in FIG. 4, when the output buffer memory 4C is found to be in the empty state, the almost empty state, or the half state, the control section 4D generates a low-level output suspension signal Sa. When the output buffer memory 4C is found to be in the almost full state or the full state, the control section 4D generates a high-level output suspension signal Sa. As shown in FIG. 4, when the output buffer memory 4C is found to be in the empty state or the almost empty state, the control section 4D generates a high-level output requirement signal Sb. When the output buffer memory 4C is found to be in the half state, the almost full state, or the full state, the control section 4D generates a low-level output requirement signal Sb. The control section 4D feeds the output suspension signal Sa and the output requirement signal Sb to the IDFT section 4B and the input buffer memory 4E.

When the output suspension signal Sa is in the low-level state, the IDFT section 4B is enabled to write the real-part multiplexing resultant signal and the imaginary-part multiplexing resultant signal into the output buffer memory 4C. In addition, when the output suspension signal Sa is in the low-level state, the symbol-by-symbol updating of the signals read out from the input buffer memory 4E is enabled. When the output suspension signal Sa changes to the high-level state as a result of an increase in the amount of effective data in the output buffer memory 4C, the IDFT section 4B is inhibited from writing the real-part multiplexing resultant signal and the imaginary-part multiplexing resultant signal into the output buffer memory 4C. In addition, the updating of the signals read out from the input buffer memory 4E is inhibited so that the same-symbol signals continue to be periodically read out therefrom. Thus, the amount of effective data in the output buffer memory 4C decreases since the effective data continues to be read out therefrom at a given rate. When the output suspension signal Sa changes to the low-level state as a result of the decrease in the amount of effective data in the output buffer memory 4C, the symbol-by-symbol updating of the signals read out from the input buffer memory 4E is restarted. In addition, the IDFT section 4B is restarted to write the real-part multiplexing resultant signal and the imaginary-part multiplexing resultant signal into the output buffer memory 4C.

As previously described, the control section 4D is informed by the IDFT section 4B of the real-part multiplexing resultant signal and the imaginary-part multiplexing resultant signal. The control section 4D is programmed to implement the following processes. For every symbol, the control section 4D executes calculation and decision related to an instantaneous peak power of at least one of the real-part multiplexing resultant signal and the imaginary-part multiplexing resultant signal before the IDFT section 4B writes the real-part multiplexing resultant signal and the imaginary-part multiplexing resultant signal into the output buffer memory 4C. Specifically, the control section 4D is programmed to calculate an instantaneous peak power (a power-related value) of at least one of the real-part multiplexing resultant signal and the imaginary-part multiplexing resultant signal. Then, the control section 4D decides whether or not the calculated peak power exceeds a given limit (a reference power). Alternatively, the control section 4D may decide whether or not the power-related value represented by one of the real-part multiplexing resultant signal and the imaginary-part multiplexing resultant signal continues to be greater than a given value during longer than a given time interval. Since the power-related value represented by one of the real-part multiplexing resultant signal and the imaginary-part multiplexing resultant signal determines a power of a corresponding IF or RF signal, each of the above-indicated decisions means a judgment as to whether or not the power of a possible IF or RF signal peaks above a reference level.

When the control section 4D detects the above-indicated over peak power conditions, the control section 4D forces the output suspension signal Sa into the high-level state and changes the control signal Sd from an initial state (a first state) to a second state. Provided that the output requirement signal Sb is in the low-level state, the high-level output suspension signal Sa inhibits the IDFT section 4B from writing the real-part multiplexing resultant signal and the imaginary-part multiplexing resultant signal into the output buffer memory 4C. In addition, the high-level output suspension signal Sa inhibits the updating of the signals read out from the input buffer memory 4E so that the same-symbol signals continue to be periodically read out therefrom. For each of the real part and the imaginary part, the switch 4A changes the connection between its 248 input terminals and its 248 output terminals in response to the change of the control signal Sd. Thus, for each of the real part and the imaginary part, the assignment of the 248 output signals of the input circuit 2 to the 248 input terminals of the IDFT section 4B is changed. This means that the assignment of the data pieces to the carriers is changed. Accordingly, in this case, the IDFT section 4B executes the IDFT process on the same-symbol information while the assignment of the data pieces to the carriers is changed. Then, the control section 4D executes the above-indicated peak power decision regarding the new real-part multiplexing resultant signal and the new imaginary-part multiplexing resultant signal generated by the IDFT section 4B. When the over peak power conditions are found to be absent, the control section 4D returns the output suspension signal Sa into the low-level state. The low-level output suspension signal Sa enables the IDFT section 4B to write the new real-part multiplexing resultant signal and the new imaginary-part multiplexing resultant signal into the output buffer memory 4C. In addition, the low-level output suspension signal Sa enables the updating of the signals read out from the input buffer memory 4E. In general, since most of 248 real-part or imaginary-part data pieces are different from each other, a change in the assignment of the data pieces to the carriers results in a change in the instantaneous peak power of the real-part or imaginary-part multiplexing resultant signal.

On the other hand, when the over peak power conditions are found to be still present, the control section 4D keeps the output suspension signal Sa in the high-level state and changes the control signal Sd from the second state to a third state. For each of the real part and the imaginary part, the switch 4A changes the connection between its 248 input terminals and its 248 output terminals in response to the change of the control signal Sd. Thus, the assignment of the data pieces to the carriers is further changed. Accordingly, in this case, the IDFT section 4B executes the IDFT process on the same-symbol information while the assignment of the data pieces to the carriers is further changed. Then, the control section 4D executes the above-indicated peak power decision regarding the new real-part multiplexing resultant signal and the new imaginary-part multiplexing resultant signal generated by the IDFT section 4B. When the over peak power conditions are found to be absent, the control section 4D returns the output suspension signal Sa into the low-level state. The low-level output suspension signal Sa enables the IDFT section 4B to write the new real-part multiplexing resultant signal and the new imaginary-part multiplexing resultant signal into the output buffer memory 4C. In addition, the low-level output suspension signal Sa enables the updating of the signals read out from the input buffer memory 4E.

On the other hand, when the over peak power conditions are found to be still present, the control section 4D keeps the output suspension signal Sa in the high-level state and changes the control signal Sd from the third state to a fourth state. The above-indicated processes are iterated until the over peak power conditions disappear or until the output requirement signal Sb is changed to the high-level state. The IDFT section 4B includes a memory which stores pairs of the real-part multiplexing resultant signals and the imaginary-part multiplexing resultant signals regarding the same-symbol information (the present-symbol information). When the output requirement signal Sb is changed to the high-level state, the control section 4D selects one pair out of the pairs of the real-part multiplexing resultant signals and the imaginary-part multiplexing resultant signals regarding the same-symbol information. The selected pair corresponds to the lowest peak power among the peak powers related to the respective pairs. Then, the control section 4D enables the IDFT section 4B to write the selected pair of the real-part multiplexing resultant signal and the imaginary-part multiplexing resultant signal into the output buffer memory 4C. In addition, the high-level output requirement signal Sb restarts the updating of the signals read out from the input buffer memory 4E.

The 512 carriers are sequentially numbered as the 512 input terminals of the main portion of the IDFT device 4 for each of the real part and the imaginary part are numbered. As previously described, the assignment of the data pieces to the 248 carriers is changed in accordance with a change in the connection state of the switch 4A. The assignment of the data pieces to the carriers is changeable among, for example, 16 different types. It is now assumed that the data pieces have 8-bit segments "AB", "CD", "EF", "GH", . . . each having a pair of a 4-bit real-part segment and a 4-bit imaginary-part segment. FIG. 5 shows a first type of the assignment of the data pieces to the carriers. In FIG. 5, the 4-bit real-part data segment "A" and the 4-bit imaginary-part data segment "B" are assigned to the 64-th carrier, and the 4-bit real-part data segment "C" and the 4-bit imaginary-part data segment "D" are assigned to the 448-th carrier. In addition, the 4-bit real-part data segment "E" and the 4-bit imaginary-part data segment "F" are assigned to the 32-nd carrier, and the 4-bit real-part data segment "G" and the 4-bit imaginary-part data segment "H" are assigned to the 416-th carrier. FIG. 6 shows a second type of the assignment of the data pieces to the carriers. In FIG. 6, the 4-bit real-part data segment "C" and the 4-bit imaginary-part data segment "D" are assigned to the 64-th carrier, and the 4-bit real-part data segment "E" and the 4-bit imaginary-part data segment "F" are assigned to the 448-th carrier. In addition, the 4-bit real-part data segment "G" and the 4-bit imaginary-part data segment "H" are assigned to the 32-nd carrier, and the 4-bit real-part data segment "I" and the 4-bit imaginary-part data segment "J" are assigned to the 416-th carrier. Further, the 4-bit real-part data segment "A" and the 4-bit imaginary-part data segment "B" are assigned to the final carrier. As understood from FIGS. 5 and 6, the second type of the assignment results from shifting the first type of the assignment. Each of a third and later types of the assignment is provided by shifting the immediately-preceding type.

As previously described, the assignment of the data pieces to the 248 carriers is changed in accordance with a change in the connection state of the switch 4A. The connection state of the switch 4A changes in response to a change in the state of the control signal Sd. The first state to the sixteenth state of the control signal Sd are designed to correspond to the first type to the sixteenth type of the assignment of the data pieces to the carriers. Accordingly, when the control signal Sd changes from the first state to the second state, the first type of the assignment (FIG. 5) is replaced by the second type of the assignment (FIG. 6).

As previously described, the control signal Sd (that is, the transmission mode signal) is transmitted by one of the 257 carries. The control signal Sd (that is, the transmission mode signal) represents the type of the assignment of the data pieces to the 248 carriers which is used by the IDFT device 4.

With reference back to FIG. 2, the DFT QAM decoding circuit 26 includes a digital signal processor (DSP) which has a combination of an input/output port, a processing section, a ROM, and a RAM. The DFT QAM decoding circuit 26 operates in accordance with a program stored in the ROM. The signal processing executed by the DFT QAM decoding circuit 26 in the signal receiving apparatus of FIG. 2 is inverse with respect to the signal processing by the IDFT device 4 in the signal transmitting apparatus of FIG. 1. The DFT QAM decoding circuit 26 recovers the control signal Sd (that is, the transmission mode signal), and derives information of the currently-used type of the assignment of the data pieces to the 248 carriers. The DFT QAM decoding circuit 26 rearranges data pieces into the original order in response to the derived assignment information.

Second Embodiment

A second embodiment of this invention is similar to the first embodiment thereof except for the following design changes.

FIG. 7 shows a first type of the assignment of the data pieces to the carriers according to the second embodiment of this invention. In FIG. 7, the 4-bit real-part data segment "A" and the 4-bit imaginary-part data segment "B" are assigned to the 64-th carrier, and the 4-bit real-part data segment "C" and the 4-bit imaginary-part data segment "D" are assigned to the 448-th carrier. In addition, the 4-bit real-part data segment "E" and the 4-bit imaginary-part data segment "F" are assigned to the 32-nd carrier, and the 4-bit real-part data segment "G" and the 4-bit imaginary-part data segment "H" are assigned to the 416-th carrier. Further, the final 4-bit real-part data segment "Y" and the final 4-bit imaginary-part data segment "Z" are assigned to the final carrier. FIG. 8 shows a second type of the assignment of the data pieces to the carriers according to the second embodiment of this invention. In FIG. 8, the 4-bit real-part data segment "A" and the 4-bit imaginary-part data segment "D" are assigned to the 64-th carrier, and the 4-bit real-part data segment "C" and the 4-bit imaginary-part data segment "F" are assigned to the 448-th carrier. In addition, the 4-bit real-part data segment "E" and the 4-bit imaginary-part data segment "H" are assigned to the 32-nd carrier, and the 4-bit real-part data segment "G" and the 4-bit imaginary-part data segment "J" are assigned to the 416-th carrier. Further, the final 4-bit real-part data segment "Y" and the 4-bit imaginary-part data segment "B" are assigned to the final carrier. As understood from FIGS. 7 and 8, the second type of the assignment results from shifting the first type of the assignment in only the imaginary part. FIG. 9 shows a third type of the assignment of the data pieces to the carriers according to the second embodiment of this invention. In FIG. 9, the 4-bit real-part data segment "A" and the 4-bit imaginary-part data segment "F" are assigned to the 64-th carrier, and the 4-bit real-part data segment "C" and the 4-bit imaginary-part data segment "H" are assigned to the 488-th carrier. In addition, the 4-bit real-part data segment "E" and the 4-bit imaginary-part data segment "J" are assigned to the 32-nd carrier, and the 4-bit real-part data segment "G" and the 4-bit imaginary-part data segment "L" are assigned to the 416-th carrier. Further, the final 4-bit real-part data segment "Y" and the 4-bit imaginary-part data segment "D" are assigned to the final carrier. As understood from FIGS. 8 and 9, the third type of the assignment results from shifting the second type of the assignment in only the imaginary part. Each of a fourth and later types of the assignment is provided by shifting the immediately-preceding type in only the imaginary part.

Third Embodiment

A third embodiment of this invention is similar to the first embodiment thereof except for the following design changes. The third embodiment of this invention includes an IDFT device 40 instead of the IDFT device 4 in FIGS. 1 and 3.

Figure 10:
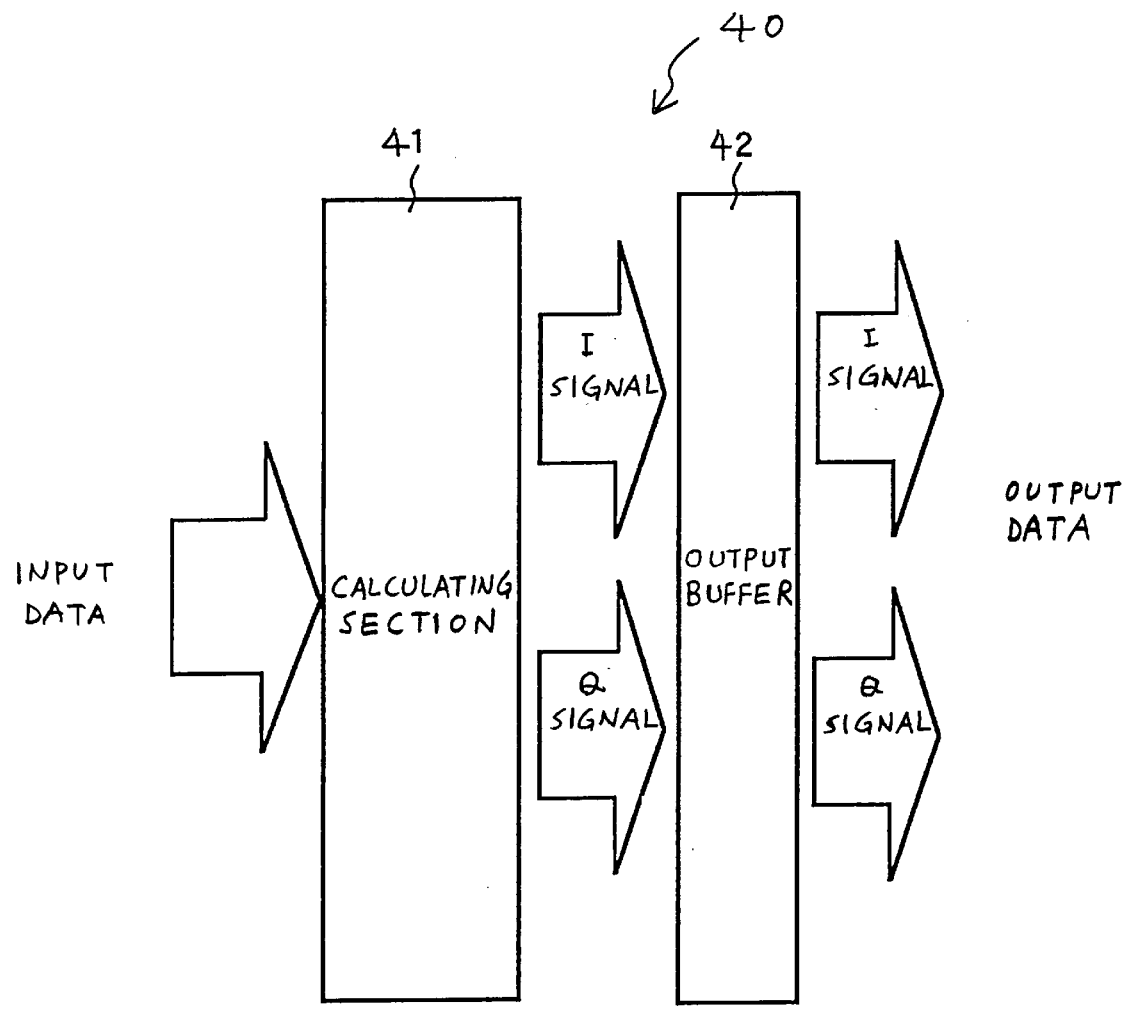
FIG. 10 is a block diagram of an IDFT device in a signal transmitting apparatus according to a third embodiment of this invention.

As shown in FIG. 10, the IDFT device 40 includes a calculating section 41 and an output buffer memory 42. The calculating section 41 is formed by, for example, a digital signal processor (DSP). The calculating section 41 is programmed to execute an IDFT process having 512 ($2^9$) points and a complex radix-2. The IDFT process is of the time thinning-out, input data bit reverse, and output data in-line type. The IDFT process has a first stage to an eighth stage. Furthermore, the IDFT process has first and second final stages following the eighth stage.

The calculating section 41 executes the first stage to the eighth stage of the IDFT process in a normal way. A former half of 512 calculation results of the eighth stage are denoted by $E_0$–$E_{255}$ respectively while a latter half thereof are denoted by $H_0$–$H_{255}$ respectively. After the eighth stage, the calculating section 41 executes the first final stage in which the data pieces $E_0$–$E_{255}$ are used as they are while the data pieces $H_0$–$H_{255}$ are set to "0". A calculation result of the first final stage is denoted by F1(t). After the eighth stage, the calculating section 41 also executes the second final stage in which the data pieces $E_0$–$E_{255}$ are set to "0" while the data pieces $H_0$–$H_{255}$ are used as they are. A calculation result of the second final stage is denoted by F2(t).

The first and the second final stages compose a ninth stage following the eighth stage. A calculation result F(t) of the ninth stage is given as follows.

$$F(t)=F1(t)+F2(t)$$

In the case where the data F(t) has a peak value (a peak power-related value) above a reference value, the data F2(t) is shifted and then the shift-resultant data F2'(t) and the data F1(t) are added to provide new data F'(t) which has a peak value equal to or less than the reference value.

Figure 11:
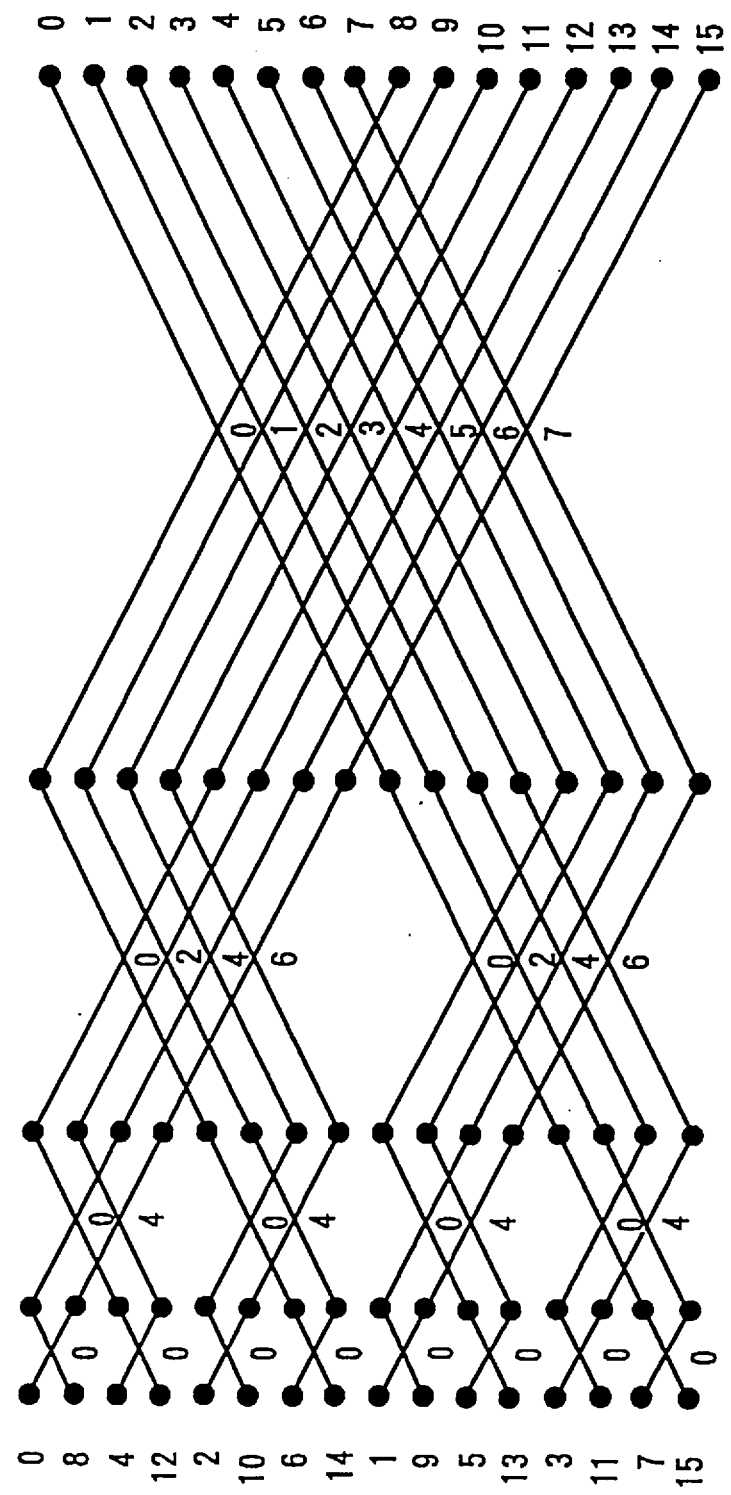
FIG. 11 is a signal flow diagram of inverse discrete Fourier transform in the third embodiment of this invention.

For simplicity of description, it is now assumed that the IDFT process has 16 ($2^4$) points. Normally, as shown in FIG. 11, data pieces inputted in the bit reverse order are subjected to butterfly calculations at a first stage to a fourth stage. In FIG. 11, the numerals denote values "n" in rotation factors $W^n$ given as $W^n 32 \exp(-j2\pi n/16)$. Now, the data pieces are expressed by complex numbers as (R1+jI1) and (R2+jI2). With respect to the data pieces (R1+jI1), each of the butterfly calculations corresponds to operation as $(R1+jI1)+(R2+iI2)W^n$. With respect to the data pieces (R2+jI2), each of the butterfly calculations corresponds to operation as $(R1+jI1) -(R2+iI2)W^n$. It should be noted that ½ scaling for the calculation at each of the stages is omitted from the description.

Figure 12:
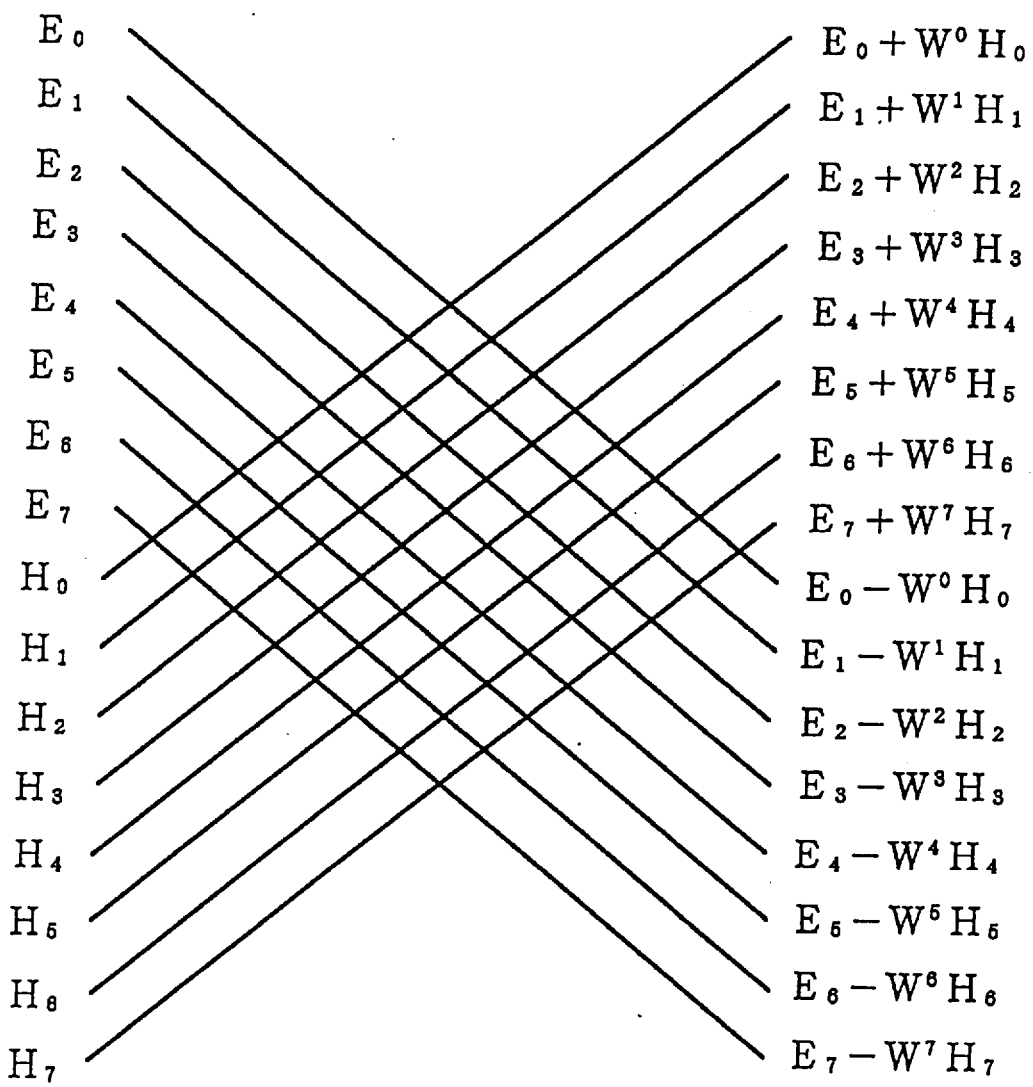
FIG. 12 is a signal flow diagram of a fourth stage of inverse discrete Fourier transform in the third embodiment of this invention.

The 16-point IDFT process has a first stage to a fourth stage. The first stage to the third stage of the IDFT process are normally executed. A former half of 16 calculation results of the third stage are denoted by $E_0$–$E_7$ respectively while a latter half thereof are denoted by $H_0$–$H_7$ respectively. After the third stage, the fourth stage of the IDFT process is executed. During the fourth stage, the data pieces $E_0$–$E_7$ and the data pieces $H_0$–$H_7$ are subjected to calculations as shown in FIG. 12. A calculation result of the fourth stage (the final stage) is denoted by F(t). The calculation result F(t) is composed of two functions F1(t) and F2(t). Thus, the calculation result F(t) is given as "F(t)=F1(t)+F2(t)". Here, the function F1(t) is given as follows.

$$F1(t)=E_t \ (0 \leq t < 8)$$

$$F1(t)=E_{t-8} \ (8 \leq t < 16)$$

The function F2(t) is given as follows.

$$F2(t)=W^t H_t \ (0 \leq t < 8)$$

$$F2(t)=-W^{t-8} H_{t-8} \ (8 \leq t < 16)$$

The function F1(t) is determined by executing the calculations at the fourth stage in which the data pieces $E_0$–$E_7$ are used as they are while the data pieces $H_0$–$H_7$ are set to "0". It is understood from FIG. 12 that the function F1(t) can also be given as repetition of the data pieces $E_0$–$E_7$.

The function F2(t) is determined by executing the calculations at the fourth stage in which the data pieces $H_0$–$H_7$ are used as they are while the data pieces $E_0$–$E_7$ are set to "0".

As understood from FIG. 12, the function F2(t) can also be provided by calculating values $W^0 H_0$ to $W^7 H_7$, and using the polarity inversions of the values $W^0 H_0$ to $W^7 H_7$.

A consideration will now be given of the case where an input data sequence or an input data set $\{a_0, a_1, \ldots, a_{15}\}$ occurs as transmitted information. These 16 data values are assigned to respective carriers (carrier frequencies) according to given rules. It is now assumed that an input data set which has undergone the assignment process is expressed as $\{b_0, b_8, b_4, b_{12}, b_2, b_{10}, b_6, b_{14}, b_1, b_9, b_5, b_{13}, b_3, b_{11}, b_7, b_{15}\}$. This data set is inputted from the left-hand side of FIG. 11 before being subjected to the IDFT process.

In one view, the result of the IDFT calculations on an input data set $\{b_0, b_8, b_4, b_{12}, b_2, b_{10}, b_6, b_{14}, 0, 0, 0, 0, 0, 0, 0, 0\}$ corresponds to the function F1(t) while the result of the IDFT calculations on an input data set $\{0, 0, 0, 0, 0, 0, 0, 0, b_1, b_9, b_5, b_{13}, b_3, b_{11}, b_7, b_{15}\}$ corresponds to the function F2(t). As previously described, the final calculation result F(t) which corresponds to an OFDM signal to be transmitted is given as "F(t)=F1(t)+F2(t)". In the case where the data F(t) has a peak value (a peak power-related value) above a reference value, the data F2(t) is shifted by several samples and then the shift-resultant data F2'(t) and the data F1(t) are added to provide new data F'(t). The new data F'(t) replaces the previous one F(t).

According to a first example, the data F2(t) is shifted forward or backward by several samples so that time positions at which maximum values of the function F1(t) and the shift-resultant function F2'(t) occur will be different from each other, and that time positions at which minimum values of the function F1(t) and the shift-resultant function F2'(t) occur will be different from each other. According to a second example, the data F2(t) is shifted forward or backward by several samples so that a time position at which a maximum value of the function F1(t) occurs will be equal to a time position of a minimum value of the shift-resultant function F2'(t). According to a third example, the data F2(t) is shifted so that time positions (for example, 5 time positions) at which great values of the function F1(t) occur will be different from time positions of great values of the shift-resultant function F2'(t), and that time positions (for example, 5 time positions) at which small values of the function F1(t) occur will be different from time positions of small values of the shift-resultant function F2'(t).

The functions F1(t) and F2(t) are of the complex type. Now, the functions F1(t) and F2(t) are expressed as follows.

$$F1(t)=F1_R(t)+jF1_I(t)$$

$$F2(t)=F2_R(t)+jF2_I(t)$$

In this case, the sum of the functions $F1_R(t)$ and $F2_R(t)$ corresponds to an I signal (an in-phase signal or a real-part signal) while the sum of the functions $F1_I(t)$ and $F2_I(t)$ corresponds to a Q signal (a quadrature signal or an imaginary-part signal). Shifting the data F2(t) means shifting the data $F2_R(t)$ and the data $F2_I(t)$ by equal numbers of samples. Shifting the data F2(t) to reduce a peak value is implemented in consideration of both the I signal and the Q signal.

In the case where the data F(t) has a peak value (a peak power-related value) above the reference value, the calculating section 41 in FIG. 10 executes shifting the function F2(t) in the above-indicated way to reduce the peak value to the reference value or less. Then, the calculating section 41 writes the resultant new data F'(t) into the output buffer memory 42. The data F'(t) is temporarily stored in the output buffer memory 42 before being read out therefrom.

FIG. 13 shows an example of shifting the function F2(t) by one sample. It is understood from FIG. 13 that the result of shifting the function F2(t) by one sample corresponds to an assumed case where the calculation result of the third stage is given as follows.

$$H_t' = W^1 H_{t+1} \, mod(t, \, 8)$$

When the eight points in a latter part of the calculation result of the second stage are denoted by $C_0$–$C_3$ and $D_0$–$D_3$ respectively, subsequent IDFT calculation (the third stage of the IDFT process) is done as shown in FIG. 14 under normal conditions. According to tracing back by referring to the above-indicated equation of $H_t'$, the calculation result of the second stage corresponds to that shown in FIG. 15 when shifting the function F2(t) is implemented.

Figure 16:
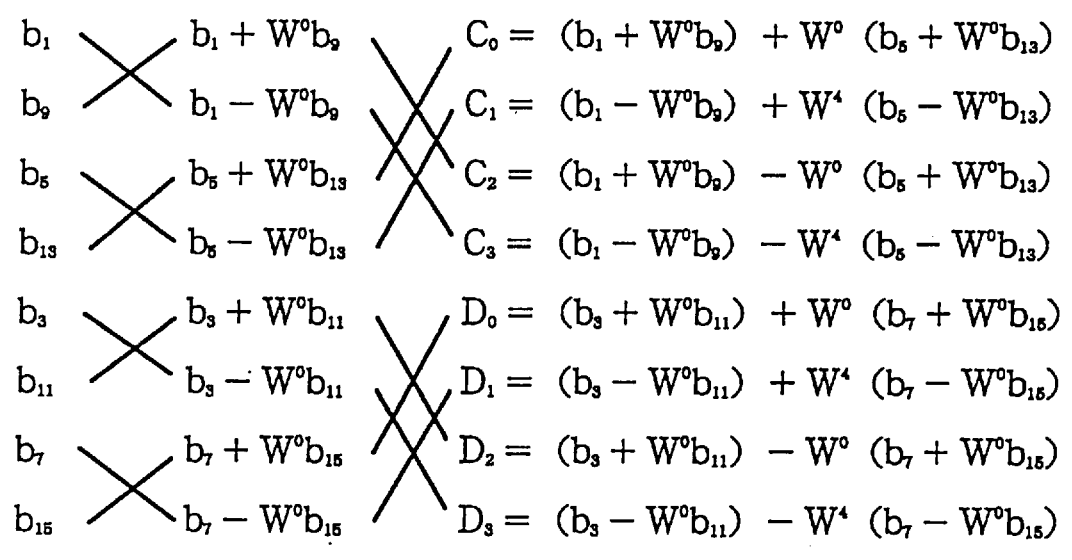
Figure 17:
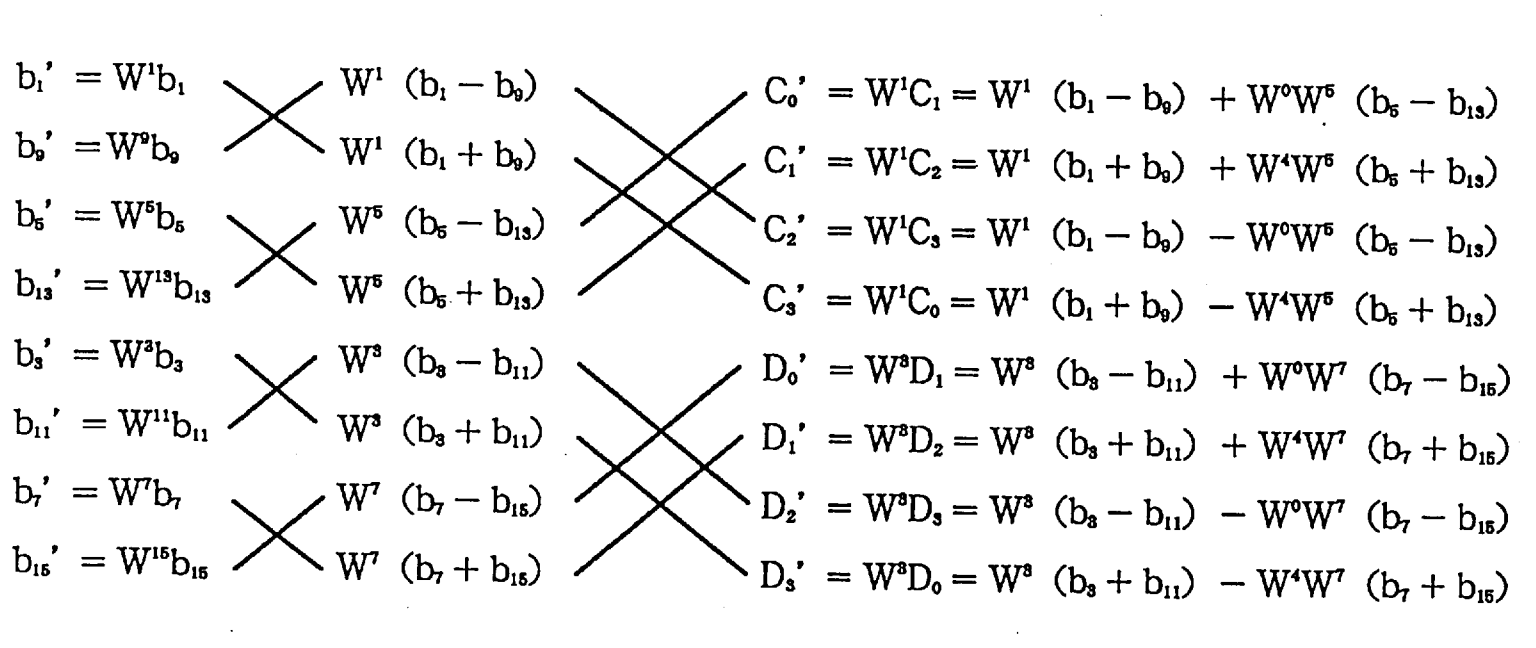

Under normal conditions, the input data sequence is calculated back as shown in FIG. 16. On the other hand, when shifting the function F2(t) is implemented, the input data sequence is calculated back as shown in FIG. 17. Accordingly, in the case where the original information to be transmitted, that is, the input data set, is denoted as $\{b_0, b_8, b_4, b_{12}, b_2, b_{10}, b_6, b_{14}, b_1, b_9, b_5, b_{13}, b_3, b_{11}, b_7, b_{15}\}$, shifting the function F2(t) is equivalent to replacing the input data set by an assumed data set $\{b_0, b_8, b_4, b_{12}, b_2, b_{10}, b_6, b_{14}, W^1 b_1, W^9 b_9, W^5 b_5, W^{13} b_{13}, W^3 b_3, W^{11} b_{11}, W^7 b_7, W^{15} b_{15}\}$. Thus, in respect of shifting the function F2(t), a former half of the assignment of the data pieces to the carriers remains unchanged while a latter half thereof corresponds to advancing the multiplexing-resultant waveform by a 1-sample time interval.

All the input data pieces are equal in maximum amplitude. As understood from the previous description, the input data pieces $b_0, b_8, b_4, b_{12}, b_2, b_{10}, b_6$, and $b_{14}$ are equal in phase. The input data piece $b_1$ is assigned to the fundamental frequency (one period per symbol). Thus, the input data piece $b_1$ is provided with a phase advance (an angle advance) corresponding to one $W^1$. The input data piece $b_9$ is assigned to nine times the fundamental frequency (one period per symbol). The input data piece $b_9$ is provided with a phase advance (an angle advance) corresponding to nine $W^1$. The input data piece $b_5$ is assigned to five times the fundamental frequency (one period per symbol). The input data piece $b_5$ is provided with a phase advance (an angle advance) corresponding to five $W^1$. The input data piece $b_{13}$ is assigned to thirteen times the fundamental frequency (one period per symbol). The input data piece $b_{13}$ is provided with a phase advance (an angle advance) corresponding to thirteen $W^1$. The input data piece $b_3$ is assigned to three times the fundamental frequency (one period per symbol). The input data piece $b_3$ is provided with a phase advance (an angle advance) corresponding to three $W^1$. The input data piece $b_{11}$ is assigned to eleven times the fundamental frequency (one period per symbol). The input data piece $b_{11}$ is provided with a phase advance (an angle advance) corresponding to eleven $W^1$. The input data piece $b_7$ is assigned to seven times the fundamental frequency (one period per symbol). The input data piece $b_7$ is provided with a phase advance (an angle advance) corresponding to seven $W^1$. The input data piece $b_{15}$ is assigned to fifteen times the fundamental frequency (one period per symbol). The input data piece $b_{15}$ is provided with a phase advance (an angle advance) corresponding to fifteen $W^1$.

The calculating section 41 generates data representing the assignment of the data pieces to the carriers. The assignment data is transmitted by using, for example, the fundamental-frequency carrier corresponding to the data piece $b_1$. Reference data is inserted into the assignment data. The reference data is used by a decoding side (a receiver side) in deciding corrective quantities. The reference data represents a predetermined reference phase. For example, in the case where the reference data represents a phase of 0 degree, when the receiver side detects that the data piece $b_1'$ (the recovered data piece corresponding to the original data piece $b_1$) has a phase advance of $\alpha'$ degrees, the phase advance corresponds to positive or negative several $W^1$.

Figure 18:
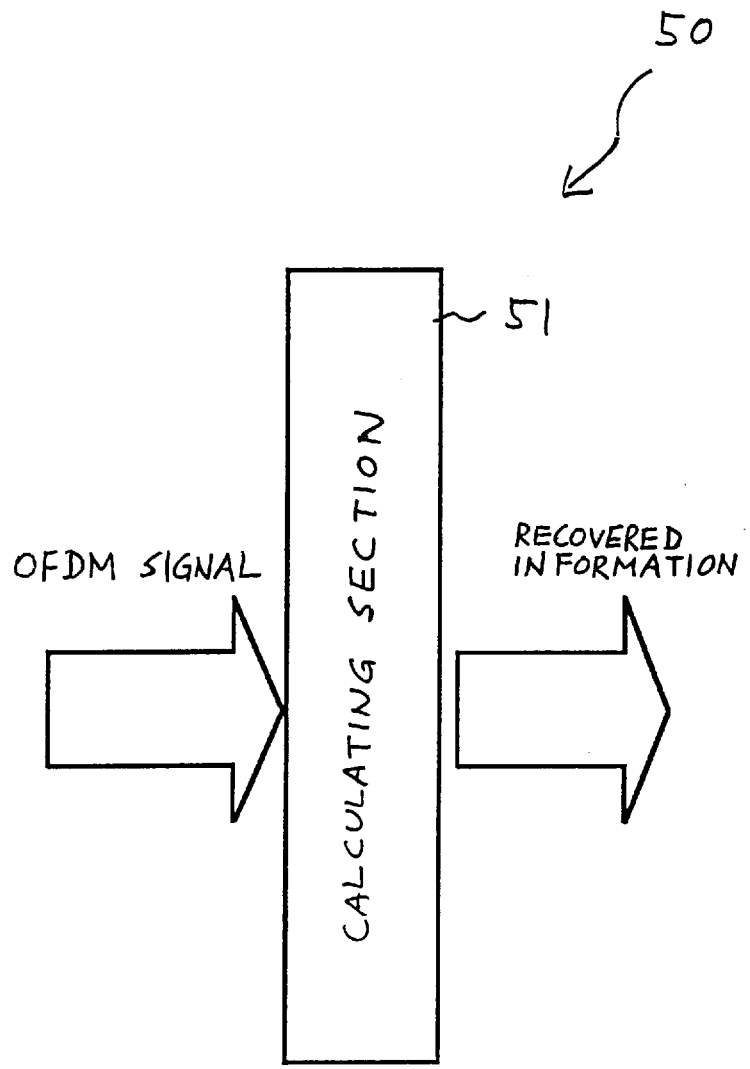
FIG. 18 is a block diagram of a DFT QAM decoding circuit in a signal receiving apparatus according to the third embodiment of this invention.

Third embodiment of this invention includes a DFT QAM decoding circuit 50 instead of the DFT QAM decoding circuit 26 in FIG. 2. As shown in FIG. 18, the DFT QAM decoding circuit 50 includes a calculating section 51. The calculating section 51 is formed by, for example, a digital signal processor (DSP). The calculating section 51 is programmed to implement the following processes. A consideration is now given of the case where the reference data represents a phase of 0 degree and the data piece $b_1'$ (corresponding to the reference data) has a phase advance of $\alpha'$ degrees. In this case, to recover the data piece $b_9$, the phase of the data piece $b_9'$ is retarded by nine times the value $\alpha'$ since the data piece $b_1'$ has a phase advance of $\alpha'$ degrees. To recover the data piece $b_5$, the phase of the data piece $b_5'$ is retarded by five times the value $\alpha'$. To recover the data piece $b_{13}$, the phase of the data piece $b_{13}'$ is retarded by thirteen times the value $\alpha'$. To recover the data piece $b_3$, the phase of the data piece $b_3'$ is retarded by three times the value $\alpha'$. To recover the data piece $b_{11}$, the phase of the data piece $b_{11}'$ is retarded by eleven times the value $\alpha'$. To recover the data piece $b_7$, the phase of the data piece $b_7'$ is retarded by seven times the value $\alpha'$. To recover the data piece $b_{15}$, the phase of the data piece $b_{15}'$ is retarded by fifteen times the value $\alpha'$.

Alternatively, the reference data may be inserted into the data piece $b_3$. In this case, when the data piece $b_3'$ (corresponding to the reference data) has a phase advance of $\beta'$ degrees, the phase of the data piece $b_1'$ is retarded by the value $\beta'/3$ to recover the data piece $b_1$. The phase of the data piece $b_9'$ is retarded by nine times the value $\beta'/3$ to recover the data piece $b_9$. The phase of the data piece $b_5'$ is retarded by five times the value $\beta'/3$ to recover the data piece $b_5$. The phase of the data piece $b_{13}'$ is retarded by thirteen times the value $\beta'/3$ to recover the data piece $b_{13}$. The phase of the data piece $b_{11}'$ is retarded by eleven times the value $\beta'/3$ to recover the data piece $b_{11}$. The phase of the data piece $b_7'$ is retarded by seven times the value $\beta'/3$ to recover the data piece $b_7$. The phase of the data piece $b_{15}'$ is retarded by fifteen times the value $\beta'/3$ to recover the data piece $b_{15}$.

With reference back to FIG. 10, the calculating section 41 in the IDFT device 40 executes the second final stage of the IDFT process in which the data pieces $E_0$–$E_{255}$ are set to "0" while the data pieces $H_0$–$H_{255}$ are used as they are. Thereby, the calculating section 41 provides the calculation result F2(t) of the second final stage. The data sequence F2(t) is expressed as $\{K_0, K_1, K_2, \ldots, K_{511}\}$. Shifting the data sequence F2(t) by one sample results in a new data sequence expressed as $\{K_1, K_2, \ldots, K_{511}, K_0\}$. This shift is equivalent to advancing the time-base waveform F2(t) by a 1-sample time interval. Regarding the shift-resultant data sequence, the data pieces on the respective carriers are received by the receiver side while they have corresponding phase advances.

A description is now given of the case where the former half of the input data set to the calculating section 41 is given as $\{b_0, 0, 0, b_{384}, b_{64}, 0, 0, b488, b_{32}, 0, 0, b416, b_{96}, 0, 0, b_{480}, b_{16}, \ldots, b_{510}\}$, and the latter half thereof is given as $\{b_1, 0, 0, b385, b_{65}, 0, 0, b_{449}, b_{33}, 0, 0, b_{417}, b_{97}, 0, 0, b_{481}, b_{17}, \ldots, b_{511}\}$. It is now assumed that the input data set undergoes the IDFT process and the data shifting process in the transmitter side. In this case, the calculating section 51 in the DFT QAM decoding circuit 50 of FIG. 18 recovers the former half of a data set which is given as $\{b_0, 0, 0, b384, b_{64}, 0, 0, b488, b_{32}, 0, 0, b416, b_{96}, 0, 0, b_{480}, b_{16}, \ldots, b_{510}\}$. Thus, the recovered former half of the data set is equal to the former half of the original data set. On the other hand, the calculating section 51 recovers the latter half of a data set which is given as $\{W^1 b_1, 0, 0, W^{385} b_{385}, W^{65} b_{65}, 0, 0, W^{449} b_{449}, W^{33} b_{33}, 0, 0, W^{417} b_{417}, W^{97} b_{97}, 0, 0, W^{481} b_{481}, W1^7 b_{17}, \ldots, W511 b_{511}\}$. Here, "$W^n$" denote rotation factors of the IDFT process which are given as $W^n = \exp(-j2\pi n/512)$. To recover the latter half of the original data set, the calculating section 51 multiplies the data pieces $W^1 b_1$, $W^{385} b385$, $W^{65} b_{65}$, $W^{449} b_{449}$, $W^{33} b_{33}$, $W^{417} b_{417}$, $W^{97} b_{97}$, $W^{481} b_{481}$, $W^{17} b_{17}, \ldots, W^{511} b_{511}$ by corrective quantities $W^{-1}$, $W^{-385}$, $W^{-65}$, $W^{-449}$, $W^{-33}$, $W^{-417}$, $W^{-97}$, $W^{-481}$, $W^{-17}, \ldots, W^{-511}$, respectively.

A first method of calculating corrective quantities for data shift by ±n samples is to specify one carrier and set the specified carrier as a carrier hole. Then, at a step following the execution of the IDFT process, information of the data shift is added to a signal corresponding to the specified carrier (the carrier hole). The first method is carried out by using a SIN table prepared for the IDFT process. The receiver side executes correction in response to the information of the data shift.

A second method of calculating corrective quantities for data shift by ±n samples is to insert reference data into the data piece $b_1$ as previously described. The carrier frequency to which the data piece $b_1$ is assigned agrees with a fundamental frequency $f_1$ corresponding to one period per symbol. The receiver side detects a data piece $b_1'$ corresponding to the original data piece $b_1$. The receiver side also detects a phase difference regarding the fundamental frequency $f_1$ by carrying out calculation as "$b_1'/b_1$". Then, the receiver side sets a basic corrective quantity as "$b_1/b_1'$". The receiver side recovers the original data pieces $b_n$ by correcting the corresponding detected data pieces $b_n'$ in response to the basic corrective quantity $b_1/b_1'$ according to calculations as $(b_1/b_1')^n b_n'$.

The second method of calculating the corrective quantities will be further described. Reference data $S_{TX}$ to be transmitted is now expressed as follows.

$$S_{TX} = x_S + j y_S$$

This equation is separated into the following polar-coordinate equations.

$$x_S = S \cos(\theta_S)$$
$$y_S = S \sin(\theta_S)$$

where $S = \sqrt{x_S^2 + y_S^2}$, $\theta_S = \tan^{-1}(y_S/x_S)$. Received reference data $S_{TX}'$ corresponding to the original reference data $S_{TX}$ is expressed as follows.

$$S_{TX}' = x_S' j y_S'$$

This equation is separated into the following polar-coordinate equations.

$$x_S' = S' \cos(\theta_S')$$
$$y_S' = S' \sin(\theta_S')$$

where $S' = \sqrt{x_S'^2 + y_S'^2}$, and $\theta_S' = \tan^{-1}(y_S'/x_S')$. A corrective quantity $b_1/b_1'$ for the fundamental frequency $f_1$ is given as follows.

$$b_1 b_1' = (x_S + j y_S)/(x_S' + j y_S')$$

This equation is changed into the following polar-coordinate equation.

$$b_1/b_1' = (S/S')\{\cos(\theta_S - \theta_S') + j \sin(\theta_S - \theta_S')\}$$

In the case where the amplitudes S and S' are equal to each other, the corrective quantity $b_1/b_1'$ for the fundamental frequency $f_1$ is given as follows.

$$b_1/b_1' = \cos(\theta_S - \theta_S') + j \sin(\theta_S - \theta_S')$$

In the case where the phase value $\theta_S$ is preset to "0", the corrective quantity $b_1/b_1'$ for the fundamental frequency $f_1$ is given as follows.

$$b_1/b_1' = \cos(-\theta_S') + j \sin(-\theta_S')$$

Regarding an angle related to the phase value $-\theta_S'$, a positive direction is defined as corresponding to the counterclockwise direction ($\theta_S' < 0$).

Transmitted data representing main information is denoted by $D_{TXn}$ which is expressed as $D_{TXn} = x + jy$. Received data corresponding to the original data $D_{TXn}$ is denoted by $D_{TXn}'$ which is expressed as $D_{TXn}' = x' + jy'$. Correction of the received data $D_{TXn}'$ into the original data $D_{TXn}$ is given as follows.

$$D_{TXn} = D_{TXn}'\{\cos(\theta_S - \theta_S') + j \sin(\theta_S - \theta_S')\}^n$$
$$= D_{TXn}'[\cos\{n(\theta_S - \theta_S')\} + j \sin(\{n(\theta_S - \theta_S')\}]$$

In the case where the phase value $\theta_S$ is preset to "0", the above-indicated equation is simplified as follows.

$$D_{TXn} = D_{TXn}'\{\cos(n\theta_S\theta) - j \sin(n\theta_S')\}$$

In the case where the reference data is set in the data piece $b_m$ rather than the data piece $b_1$, a phase difference regarding the carrier frequency $f_m$ corresponding to the data piece $b_m$ is detected by carrying out calculation as "$b_m'/b_m$". A basic corrective quantity is determined on the basis of the above-indicated phase difference. The basic corrective quantity is given as "$b_m/b_m'$". Accordingly, correction of the received data $D_{TXn}'$ into the original data $D_{TXn}$ is given as follows.

$$D_{TXn} = D_{TXn}'[\cos\{(n/m)(\theta_S - \theta_S')\} + j \sin \{(n/m)(\theta_S - \theta_S')\}]$$

Since the values "$\theta_S - \theta_S'$", "$(1/m)(\theta_S - \theta_S')$", and "$\theta_S'$" are equal to integral multiples of the sample time interval, the receiver side implements the correction of the received data $D_{TXn}'$ into the original data $D_{TXn}$ by using a SIN table for the IDFT process.

Fourth Embodiment

A fourth embodiment of this invention is similar to the third embodiment thereof except for the following design changes. The fourth embodiment of this invention includes a modification of the calculating section 41 (see FIG. 10).

According to the modification of the calculating section 41, during the execution of X later stages of an IDFT process which includes a final stage, the calculation result of the {(final stage)–X}-th stage is divided into $2^X$ blocks. One of the blocks is selected and is used as it is while all the components (all the members) of the other blocks are set to "0". Then, a subsequent stage or stages of the IDFT process are executed. These calculations are performed as the selected block is changed through all the blocks. Accordingly, $2^X$ calculation results are available. In the case where the absolute value of the sum of the $2^X$ calculation results exceeds a reference value, at least one of the $2^X$ calculation results is shifted along the time base. Then, the $2^X$ shift-resultant values are added and combined into a frequency division multiplexed signal.

A description will be given of the case where the number X is equal to 2. The calculation result of the second stage of the IDFT process is divided into four blocks $A_0$–$A_3$, $B_0$–$B_3$, $C_0$–$C_3$, and $D_0$–$D_3$.

According to a first procedure, the first block $A_0$–$A_3$ is used as it is while all the components of the other blocks $B_0$–$B_3$, $C_0$–$C_3$, and $D_0$–$D_3$ are set to "0". Then, third and fourth stages of the IDFT process are executed so that a partial calculation result F1(t) of the fourth stage is available. According to a second procedure, the second block $B_0$–$B_3$ is used as it is while all the components of the other blocks $A_0$–$A_3$, $C_0$–$C_3$, and $D_0$–$D_3$ are set to "0". Then, third and fourth stages of the IDFT process are executed so that a partial calculation result F2(t) of the fourth stage is available. According to a third procedure, the third block $C_0$–$C_3$ is used as it is while all the components of the other blocks $A_0$–$A_3$, $B_0$–$B_3$, and $D_0$–$D_3$ are set to "0". Then, third and fourth stages of the IDFT process are executed so that a partial calculation result F3(t) of the fourth stage is available. According to a fourth procedure, the fourth block $D_0$–$D_3$ is used as it is while all the components of the other blocks $A_0$–$A_3$, $B_0$–$B_3$, and $C_0$–$C_3$ are set to "0". Then, third and fourth stages of the IDFT process are executed so that a partial calculation result F4(t) of the fourth stage is available. Conditions of these calculations are shown in FIG. 19.

A normal calculation result F(t) of the final stage is given as follows.

$$F(t)=F1(t)+F2(t)+F3(t)+F4(t)$$

In the case where the calculation result F(t) has a peak value above a reference value, the partial calculation results F2(t), F3(t), and F4(t) are shifted by ± several samples. Then, the partial calculation result F1(t) and the shift-resultant data pieces are added and combined into a new calculation result F'(t) whose peak value is equal to or less than the reference value. Reference data representing the number of samples corresponding to the shift are inserted into each of the second, third, and fourth blocks. The receiver side detects the number of samples corresponding to the shift by referring to the reference data. The receiver side determines a corrective value on the basis of the reference data in each of the second, third, and fourth blocks. The receiver side recovers the original data by correction responsive to the determined corrective value.

According to one example, the partial calculation result F2(t) is advanced by a time corresponding to two samples, and the partial calculation result F3(t) is advanced by a time corresponding to three samples. In addition, the partial calculation result F4(t) is retarded by a time corresponding to one sample. Then, the partial calculation result F1(t) and the shift-resultant data pieces F2'(t), F3'(t), and F4'(t) are added and combined into a new calculation result F'(t). The new calculation result F'(t) corresponds to transmitted data shown in FIG. 20. The receiver side detects the transmitted data as received data $b_n{}'$ shown in FIG. 20. The transmitter side inserts reference data into the data pieces $b_2$, $b_1$, and $b_3$.

In this case, since the first block is neither advanced nor retarded, the detected first block is used as it is without being corrected. As shown in FIG. 20, regarding the second block, the data piece $b_2{}'$ is received first, where $b_2{}'=W^4 b_2$. The receiver side calculates a basic corrective quantity a which is equal to $b_2/b_2{}'$. Then, the value $W^{-4}$ is calculated. The receiver side recovers the original data piece $b_2$ by calculating the product of the value $W^{-4}$ and the received data piece $b_2{}'$. The receiver side determines conditions of correcting the 2-sample time advance of subsequently received data pieces in the second block on the basis of the relation between the reference data and the corresponding carrier frequency. The receiver side implements the correction of subsequently received data pieces $b_{10}{}'$, $b_6{}'$, and $b_{14}{}'$ into the original data pieces $b_{10}$, $b_6$, and $b_{14}$ by referring to the following equations.

$$b_{10}=W^{-20}b_{10}{}'=\alpha^{(10/2)}b_{10}{}'$$

$$b_6=W^{-12}b_6{}'=\alpha^{(6/2)}b_6{}'$$

$$b_{14}=W^{-28}b_{14}{}'=\alpha^{(14/2)}b_{14}{}'$$

As shown in FIG. 20, regarding the third block, the data piece $b_1{}'$ is received first, where $b_1{}'=W^3 b_1$. The receiver side calculates a basic corrective quantity $\theta$ which is equal to $b_1/b_1{}'$. Then, the value $W^{-3}$ is calculated. The receiver side recovers the original data piece $b_1$ by calculating the product of the value $W^{-3}$ and the received data piece $b_1{}'$. The receiver side determines conditions of correcting the 3-sample time advance of subsequently received data pieces in the third block on the basis of the relation between the reference data and the corresponding carrier frequency. The receiver side implements the correction of subsequently received data pieces $b_9{}'$, $b_5{}'$, and $b_{13}{}'$ into the original data pieces $b_9$, $b_5$, and $b_{13}$ by referring to the following equations.

$$b_9=W^{-27}b_9{}'=\beta^{(9/1)}b_9{}'$$

$$b_5=W^{-15}b_5{}'=\beta^{(5/1)}b_5{}'$$

$$b_{13}=W^{-39}b_{13}{}'=\beta^{(13/1)}b_{13}{}'$$

As shown in FIG. 20, regarding the fourth block, the data piece $b_3{}'$ is received first, where $b_3{}'=W^{-3}b_3$. The receiver side calculates a basic corrective quantity y which is equal to $b_3/b_3{}'$. Then, the value $W^3$ is calculated. The receiver side recovers the original data piece $b_3$ by calculating the product of the value $W^3$ and the received data piece $b_3{}'$. The receiver side determines conditions of correcting the 1-sample time retard of subsequently received data pieces in the fourth block on the basis of the relation between the reference data and the corresponding carrier frequency. The receiver side implements the correction of subsequently received data pieces $b_{11}{}'$, $b_7{}'$, and $b_{15}{}'$ into the original data pieces $b_{11}$, $b_7$, and $b_{15}$ by referring to the following equations.

$$b_{11}=W^{11}b_{11}{}'=\gamma^{(11/3)}b_{11}{}'$$

$$b_7=W^7 b_7{}'=\gamma^{(7/3)}b_7{}'$$

$$b_{15}=W^{15}b_{15}{}'=\gamma^{(15/3)}b_{15}{}'$$

Fifth Embodiment

A fifth embodiment of this invention is similar to the third embodiment thereof except for the following design changes. The fifth embodiment of this invention includes a modification of the calculating section 41 (see FIG. 10).

According to peak power reduction implemented by the modification of the calculating section 41, the data F2(t) is shifted forward or backward by several samples so that a time position at which a maximum value of the function F1(t) occurs will be equal to a time position of a minimum value of the shift-resultant function F2'(t). Furthermore, when the absolute value of the minimum value of the shift-resultant function F2'(t) is considerably smaller than the absolute value of the maximum value of the function F1(t), the amplitude of the shift-resultant function F2'(t) is increased.

As previously described, a corrective quantity $b_1/b_1'$ for the fundamental frequency $f_1$ is given as follows.

$$b_1/b_1' = (S/S')\{\cos(\theta_S - \theta_S') + j\sin(\theta_S - \theta_S')\}$$

In the case where the amplitude S' of the shift-resultant function F2'(t) is set to twice the original amplitude S, the corrective quantity $b_1/b_1'$ for the fundamental frequency $f_1$ is given as follows.

$$b_1/b_1'(1/2)\{\cos(\theta_S - \theta_S') + j\sin(\theta_S - \theta_S')\}$$

On the other hand, correction of the received data $D_{TXn}'$ into the original data $D_{TXn}$ is given as follows.

$$D_{TXn} = D_{TXn}'(S/S')[\cos\{n(\theta_S - \theta_S')\} + j\sin\{n(\theta_S - \theta_S')\}]$$

What is claimed is:

1. An apparatus for generating a frequency division multiplexed signal, comprising:
   an inverse discrete Fourier transform section having a set of input terminals subjected to components of an information signal respectively, the information signal representing information to be transmitted, the inverse discrete Fourier transform section subjecting the information signal to an inverse discrete Fourier transform to convert the information signal into a pair of a first in-phase signal and a first quadrature signal while assignment of the components of the information signal to the input terminals is in a first state;
   an output buffer memory;
   first means for calculating a first power-related value of at least one of the first in-phase signal and the first quadrature signal;
   second means for deciding whether or not the calculated first power-related value exceeds a predetermined reference value;
   third means for writing the first in-phase signal and the first quadrature signal into the output buffer memory when the second means decides that the calculated first power-related value does not exceed the predetermined reference value;
   fourth means for changing the assignment of the components of the information signal to the input terminals from the first state to a second state different from the first state when the second means decides that the calculated first power-related value exceeds the predetermined reference value;
   the inverse discrete Fourier transform section subjecting the information signal to an inverse discrete Fourier transform to convert the information signal into a pair of a second in-phase signal and a second quadrature signal while the assignment of the components of the information signal to the input terminals is in the second state;
   the first means being operative for calculating a second power-related value of at least one of the second in-phase signal and the second quadrature signal;
   the second means being operative for deciding whether or not the calculated second power-related value exceeds the predetermined reference value; and
   the third means being operative for writing the second in-phase signal and the second quadrature signal into the output buffer memory when the second means decides that the calculated second power-related value does not exceed the predetermined reference value.

2. An apparatus as recited in claim 1, further comprising:
   the fourth means being operative for changing the assignment of the components of the information signal to the input terminals from the second state to a third state different from the first state and the second state when the second means decides that the calculated second power-related value exceeds the predetermined reference value;
   the inverse discrete Fourier transform section subjecting the information signal to an inverse discrete Fourier transform to convert the information signal into a pair of a third in-phase signal and a third quadrature signal while the assignment of the components of the information signal to the input terminals is in the third state;
   the first means being operative for calculating a third power-related value of at least one of the third in-phase signal and the third quadrature signal;
   the second means being operative for deciding whether or not the calculated third power-related value exceeds the predetermined reference value;
   the third means being operative for writing the third in-phase signal and the third quadrature signal into the output buffer memory when the second means decides that the calculated third power-related value does not exceed the predetermined reference value;
   fifth means for deciding which of the calculated first power-related value, the calculated second power-related value, and the calculated third power-related value is the smallest when the second means decides that the calculated first power-related value, the calculated second power-related value, and the calculated third power-related value exceed the predetermined reference value; and
   the third means being operative for writing the first in-phase signal and the first quadrature signal into the output buffer memory when the fifth means decides that the calculated first power-related value is the smallest, being operative for writing the second in-phase signal and the second quadrature signal into the output buffer memory when the fifth means decides that the calculated second power-related value is the smallest, and being operative for writing the third in-phase signal and the third quadrature signal into the output buffer memory when the fifth means decides that the calculated third power-related value is the smallest.

3. An apparatus for generating a frequency division multiplexed signal, comprising:
   an inverse discrete Fourier transform section having a first input terminal and a set of second input terminals, the first input terminal being subjected to a first signal representing a transmission mode, the second input terminals being subjected to components of a second signal representing main information to be transmitted respectively, the inverse discrete Fourier transform section subjecting the first signal and the second signal to an inverse discrete Fourier transform to convert the first signal and the second signal into a pair of a first in-phase signal and a first quadrature signal while assignment of the components of the second signal to the second input terminals is in a first state;

an output buffer memory;

first means for calculating a first power-related value of at least one of the first in-phase signal and the first quadrature signal;

second means for deciding whether or not the calculated first power-related value exceeds a predetermined reference value;

third means for writing the first in-phase signal and the first quadrature signal into the output buffer memory when the second means decides that the calculated first power-related value does not exceed the predetermined reference value;

fourth means for changing the assignment of the components of the second signal to the second input terminals from the first state to a second state different from the first state when the second means decides that the calculated first power-related value exceeds the predetermined reference value;

the inverse discrete Fourier transform section subjecting the first signal and the second signal to inverse discrete Fourier transform to convert the first signal and the second signal into a pair of a second in-phase signal and a second quadrature signal while the assignment of the components of the second signal to the second input terminals is in the second state;

the first means being operative for calculating a second power-related value of at least one of the second in-phase signal and the second quadrature signal;

the second means being operative for deciding whether or not the calculated second power-related value exceeds the predetermined reference value;

the third means being operative for writing the second in-phase signal and the second quadrature signal into the output buffer memory when the second means decides that the calculated second power-related value does not exceed the predetermined reference value; and fifth means for enabling the first signal to contain information of the assignment of the components of the second signal to the second input terminals.

4. An apparatus as recited in claim 3, further comprising:

the fourth means for changing the assignment of the components of the second signal to the second input terminals from the second state to a third state different from the first state and the second state when the second means decides that the calculated second power-related value exceeds the predetermined reference value;

the inverse discrete Fourier transform section subjecting the first signal and the second signal to inverse discrete Fourier transform to convert the first signal and the second signal into a pair of a third in-phase signal and a third quadrature signal while the assignment of the components of the second signal to the second input terminals is in the third state;

the first means being operative for calculating a third power-related value of at least one of the third in-phase signal and the third quadrature signal;

the second means being operative for deciding whether or not the calculated third power-related value exceeds the predetermined reference value;

the third means being operative for writing the third in-phase signal and the third quadrature signal into the output buffer memory when the second means decides that the calculated third power-related value does not exceed the predetermined reference value;

sixth means for deciding which of the calculated first power-related value, the calculated second power-related value, and the calculated third power-related value is the smallest when the second means decides that the calculated first power-related value, the calculated second power-related value, and the calculated third power-related value exceed the predetermined reference value; and the third means being operative for writing the first in-phase signal and the first quadrature signal into the output buffer memory when the sixth means decides that the calculated first power-related value is the smallest, being operative for writing the second in-phase signal and the second quadrature signal into the output buffer memory when the sixth means decides that the calculated second power-related value is the smallest, and being operative for writing the third in-phase signal and the third quadrature signal into the output buffer memory when the sixth means decides that the calculated third power-related value is the smallest.

5. A decoding apparatus for a frequency division multiplexed signal including a first signal and a second signal, the first signal representing a transmission mode containing information of assignment of components of the second signal to input terminals of an inverse discrete Fourier transform section in a transmitter side, the second signal representing main information, the apparatus comprising:

a discrete Fourier transform section subjecting the frequency division multiplexed a signal to discrete Fourier transform to convert the frequency division multiplexed signal into the first signal and a third signal representing the main information; and means for rearranging components of the third signal in response to the assignment information in the first signal to convert the third signal into the second signal.

6. A method of generating a frequency division multiplexed signal, comprising the steps of:

subjecting digital information signals to inverse discrete Fourier transform to generate the frequency division multiplexed signal having carriers modulated with the digital information signals respectively;

dividing a calculation result of a second latest stage of the inverse discrete Fourier transform into a former half and a latter half;

implementing a first final stage of the inverse discrete Fourier transform to generate a first final-stage calculation result F1(t) while maintaining the former half as it is and setting the latter half to zero;

implementing a second final stage of the inverse discrete Fourier transform to generate a second final-stage calculation result F2(t) while setting the former half to zero and maintaining the latter half as it is;

deciding whether or not an absolute value of a sum of the first final-stage calculation result F1(t) and the second final-stage calculation result F2(t) exceeds a predetermined reference value; and shifting the second final-stage calculation result F2(t) along a time base to convert the second final-stage calculation result F2(t) into a modified second final-stage calculation result F2(t)', and adding the first final-stage calculation result F1(t) and the modified second final-stage calculation result F2(t)' to generate the frequency division multiplexed signal in cases where the absolute value of the sum of the first final-stage calculation result F1(t) and the second final-stage calculation result F2(t) exceeds the predetermined reference value.

7. A method of generating a frequency division multiplexed signal, comprising the steps of:

subjecting digital information signals to inverse discrete Fourier transform to generate a frequency division multiplexed signal having carriers modulated with the digital information signals respectively;

dividing a calculation result of a {(final state)−X}th stage of the inverse discrete Fourier transform into $2^X$ blocks;

implementing X subsequent stages of the inverse discrete Fourier transform to generate a final-stage calculation result while maintaining one of the blocks as it is, and setting the other blocks to zero;

changing the one of the blocks to one of the other blocks until all of said blocks have been the one block, while the remaining blocks have been set to zero during the implementing step to generate $2^X$ final-stage calculation results;

deciding whether or not an absolute value of a sum of the $2^X$ final-stage calculation results exceeds a predetermined reference value; and shifting at least one of the $2^X$ final-stage calculation results along a time base to convert said one of the $2^X$ final-stage calculation results into a modified final-stage calculation result and adding others of the $2^X$ final-stage calculation results and the modified final-stage calculation result to generate the frequency division multiplexed signal in cases where the absolute value of the sum of the $2^X$ final-stage calculation results exceeds the predetermined reference value.

8. A method as recited in claim 6, further comprising the step of multiplying the second final-stage calculation result F2(t) by a given value when the second final-stage calculation result F2(t) is shifted along the time base.

9. A method as recited in claim 7, further comprising the step of multiplying said one of the $2^X$ final-stage calculation results by a given value when said one of the $2^X$ final-stage calculation results is shifted along the time base.

10. A method as recited in claim 6, further comprising the steps of:

providing a carrier hole in the frequency division multiplexed signal;

generating a reference signal representing information of said shifting and having a frequency corresponding to the carrier hole; and adding the reference signal to the frequency division multiplexed signal.

11. A method as recited in claim 7, further comprising the steps of:

providing a carrier hole in the frequency division multiplexed signal;

generating a reference signal representing information of said shifting and having a frequency corresponding to the carrier hole; and adding the reference signal to the frequency division multiplexed signal.

12. A method as recited in claim 6, further comprising the steps of:

specifying one of the carriers;

generating a reference signal representing information of said shifting; and modulating said specified one of the carriers with the reference signal.

13. A method as recited in claim 7, further comprising the steps of:

specifying one of the carriers;

generating a reference signal representing information of said shifting; and modulating said specified one of the carriers with the reference signal.

14. A decoding method for a frequency division multiplexed signal including a main information signal and a reference signal, the main information signal representing main information, the reference signal representing data shift executed in inverse discrete Fourier transform in a transmitter side, the method comprising the steps of:

subjecting the frequency division multiplexed signal to discrete Fourier transform to convert the frequency division multiplexed signal into the main information signal;

extracting the reference signal from the frequency division multiplexed signal; and controlling the discrete Fourier transform in response to the extracted reference signal to correctly recover the main information signal.

15. An apparatus for generating a frequency division multiplexed signal, comprising:

means for subjecting digital information signals to an inverse discrete Fourier transform to generate the frequency division multiplexed signal having carriers modulated with the digital information signals respectively;

means for dividing a calculation result from a second latest stage of the inverse discrete Fourier transform into a former half and a latter half;

means for implementing a first final stage of the inverse discrete Fourier transform to generate a first final-stage calculation result F1(t) while maintaining the former half as it is and setting the latter half to zero;

means for implementing a second final stage of the inverse discrete Fourier transform to generate a second final-stage calculation result F2(t) while setting the former half to zero and maintaining the latter half as it is;

means for deciding whether or not an absolute value of a sum of the first final-stage calculation result F1(t) and the second final-stage calculation result F2(t) exceeds a predetermined reference value; and means for shifting the second final-stage calculation result F2(t) along a time base to convert the second final-stage calculation result F2(t) into a modified second final-stage calculation result F2(t)', and adding the first final-stage calculation result F1(t) and the modified second final-stage calculation result F2(t)' to generate the frequency division multiplexed signal in cases where the absolute value of the sum of the first final-stage calculation result F1(t) and the second final-stage calculation result F2(t) exceeds the predetermined reference value.

16. An apparatus for generating a frequency division multiplexed signal, comprising:

means for subjecting digital information signals to inverse discrete Fourier transform to generate the frequency division multiplexed signal having carriers modulated with the digital information signals respectively;

means for dividing a calculation result of a {(final stage) −X}-th stage of the inverse discrete Fourier transform into $2^X$ blocks;

means for implementing X subsequent stages of the inverse discrete Fourier transform to generate a final-stage calculation result while maintaining one of the blocks as it is and setting the other blocks to zero;

means for changing said one through the blocks during the implementing step to generate $2^X$ final-stage calculation results;

means for deciding whether or not an absolute value of a sum of the $2^X$ final-stage calculation results exceeds a predetermined reference value; and means for shifting at least one of the $2^X$ final-stage calculation results along a time base to convert said one of the $2^X$ final-stage calculation results into a modified final-stage calculation result, and adding others of the $2^X$ final-stage calculation results and the modified final-stage calculation result to generate the frequency division multiplexed signal in cases where the absolute value of the sum of the $2^X$ final-stage calculation results exceeds the predetermined reference value.

17. An apparatus as recited in claim 15, further comprising means for multiplying the second final-stage calculation result F2(t) by a given value when the second final-stage calculation result F2(t) is shifted along the time base.

18. An apparatus as recited in claim 16, further comprising means for multiplying said one of the $2^X$ final-stage calculation results by a given value when said one of the $2^X$ final-stage calculation results is shifted along the time base.

19. An apparatus as recited in claim 15, further comprising:

means for providing a carrier hole in the frequency division multiplexed signal;

means for generating a reference signal representing information of said shifting and having a frequency corresponding to the carrier hole; and means for adding the reference signal to the frequency division multiplexed signal.

20. An apparatus as recited in claim 16, further comprising:

means for providing a carrier hole in the frequency division multiplexed signal;

means for generating a reference signal representing information of said shifting and having a frequency corresponding to the carrier hole; and means for adding the reference signal to the frequency division multiplexed signal.

21. An apparatus as recited in claim 15, further comprising:

means for specifying one of the carriers;

means for generating a reference signal representing information of said shifting; and means for modulating said specified one of the carriers with the reference signal.

22. An apparatus as recited in claim 16, further comprising:

means for specifying one of the carriers;

means for generating a reference signal representing information of said shifting; and means for modulating said specified one of the carriers with the reference signal.

23. A decoding apparatus for a frequency division multiplexed signal including a main information signal and a reference signal, the main information signal representing main information, the reference signal representing data shift executed in inverse discrete Fourier transform in a transmitter side, the apparatus comprising:

means for subjecting the frequency division multiplexed signal to discrete Fourier transform to convert the frequency division multiplexed signal into the main information signal;

means for extracting the reference signal from the frequency division multiplexed signal; and means for controlling the discrete Fourier transform in response to the extracted reference signal to correctly recover the main information signal.

24. A decoding apparatus for a frequency division multiplexed signal including a first signal and a second signal, the first signal representing a transmission mode containing information of assignment of components of the second signal to input terminals of an inverse discrete Fourier transform section in a transmitter side to prevent of the frequency division multiplexed signal power from exceeding a predetermined level, the second signal representing main information, the apparatus comprising:

a discrete Fourier transform section subjecting the frequency division multiplexed signal to a discrete Fourier transform to convert the frequency division multiplexed signal into the first signal and a third signal representing the main information; and means for rearranging components of the third signal in response to the assignment information in the first signal to convert the third signal into the second signal.

25. A decoding method for a frequency division multiplexed signal including a main information signal and a reference signal, the main information signal representing main information, the reference signal representing data shift executed in an inverse discrete Fourier transform in a transmitter side to prevent of the frequency division multiplexed signal from exceeding a predetermined level, the method comprising the steps of:

subjecting the frequency division multiplexed signal to a discrete Fourier transform to convert the frequency division multiplexed signal into the main information signal;

extracting the reference signal from the frequency division multiplexed signal; and controlling the discrete Fourier transform in response to the extracted reference signal to correctly recover the main information signal.

26. A decoding apparatus for a frequency division multiplexed signal including a main information signal and a reference signal, the main information signal representing main information, the reference signal representing a data shift executed in an inverse discrete Fourier transform in a transmitter side to prevent the frequency division multiplexed signal power from exceeding a predetermined level, the apparatus comprising:

means for subjecting the frequency division multiplexed signal to a discrete Fourier transform to convert the frequency division multiplexed signal into the main information signal;

means for extracting the reference signal from the frequency division multiplexed signal; and means for controlling the discrete Fourier transform in response to the extracted reference signal to correctly recover the main information signal.

* * * * *